United States Patent
Nowakowski

[11] Patent Number: 5,179,529
[45] Date of Patent: Jan. 12, 1993

[54] HIGH SPEED FOURIER TRANSFORM ENGINE

[75] Inventor: Michael V. Nowakowski, Los Angeles, Calif.

[73] Assignee: Hughes Aircraft Company, Los Angeles, Calif.

[21] Appl. No.: 706,561

[22] Filed: May 28, 1991

Related U.S. Application Data

[63] Continuation of Ser. No. 331,463, Mar. 31, 1989, abandoned.

[51] Int. Cl.$^5$ .......................................... G06F 15/332
[52] U.S. Cl. .................................................... 364/726
[58] Field of Search ............... 364/724.12, 726, 728.01

[56] References Cited

U.S. PATENT DOCUMENTS 4,048,485  9/1977  Nussbaumer ............... 364/724.12 X
4,062,060 12/1977  Nussbaumer ................... 364/724.12
4,063,082 12/1977  Nussbaumer ............... 364/724.12 X
4,788,654 11/1988  Duhamel et al. .............. 364/728.01

OTHER PUBLICATIONS

Nussbaumer, "Discrete Transforms Filter", IBM Tech. Discl. Bull., vol. 18, No. 12, May 1976, pp. 4048-4053.
Nussbaumer, "Digital Filtering by Complex Polynomial Transforms", IBM Tech. Discl. Bull., vol. 20, No. 9, Feb. 1978, pp. 3521-3522.

*Primary Examiner*—Tan V. Mai
*Attorney, Agent, or Firm*—L. A. Alkov; W. K. Denson-Low

[57] ABSTRACT

Fast fourier transforms are performed in digital signal processing using number theoretic transforms. Incoming pulse descriptor words are mapped into a matrix. The first convolution does forward and inverse number transforms on the rows. The second convolution does forward and inverse number transforms on the columns.

33 Claims, 3 Drawing Sheets

HIGH SPEED FOURIER TRANSFORM ENGINE

This is a continuation of application Ser. No. 331,463 filed Mar. 31, 1989, now abandoned.

FIELD OF THE INVENTION

This invention pertains to the field of signal processing and, more particularly, to an improved method for computing fast fourier transforms.

BACKGROUND OF THE INVENTION

In many signal processing areas, and particularly in the area of airborne radar, it is desirable to perform fast fourier transforms (FFTs). FFTs are necessary to convert radar signal pulses received in the time domain to the frequency domain and back again. Many types of signal processing, including pulse compression decoding, can be done in the frequency domain more quickly.

In airborne radar systems, the signal processing equipment should be carried on board the airplane. However, space and power are strictly limited on board an aircraft. Accordingly, it is important to minimize the size and power consumption of the signal processing equipment. Since FFT engines constitute a substantial part of a radar system's signal processing equipment, it is important to simplify the mathematical operations required to perform FFTs as much as possible. This not only reduces the total amount of equipment required, but the cost of a digital radar system can also be reduced by using the same hardware for different operations and by using identical hardware for different systems.

Speed is also very important in airborne radar. A modern airplane and its targets fly quickly and collect vast amounts of radar information. In order for the aircraft crew to benefit from the information, it must be processed quickly enough for the crew to respond and quickly enough to make room for new information. The simpler the mathematical operations necessary to process the incoming information, the faster the processing can be performed.

Existing FFT engines, based most commonly on the Cooley-Tukey method, require a significant amount of hardware. Since FFTs must normally be performed several times in digital signal processing, this hardware constitutes a substantial part of the entire radar system. A meaningful reduction in the amount of hardware required and in the time it takes for the hardware to operate is of great benefit in the field.

SUMMARY OF THE INVENTION

The present invention employs number theoretic transforms for performing the convolutions which make up the fourier transformation. More specifically, the present invention, in an exemplary embodiment, when exposed to incoming pulse descriptor words, sorts the words into a matrix and then performs two convolutions using number theoretic transforms. In the two convolutions, the pulse descriptor words of the matrix are multiplied by chirp and mixing factors and are then encoded. Next, a forward number theoretic transform, followed by an inverse number theoretic transform, are performed using Fermat numbers. Then, the pulse descriptor words are decoded and multiplied by chirp and mixing factors. The first convolution is performed on one dimension of the matrix, and the second convolution is performed on the other dimension of the matrix. In between the convolutions, a twiddle factor is applied to each of the terms.

In another embodiment of the present invention, the pulse descriptor words are exposed to doppler tuning filters after they have been sorted into a matrix, but before the first convolution. After the second convolution, they are exposed to a pulse compression filter and then routed back through the two convolutions again.

DETAILED DESCRIPTION OF THE INVENTION

Figure 1:
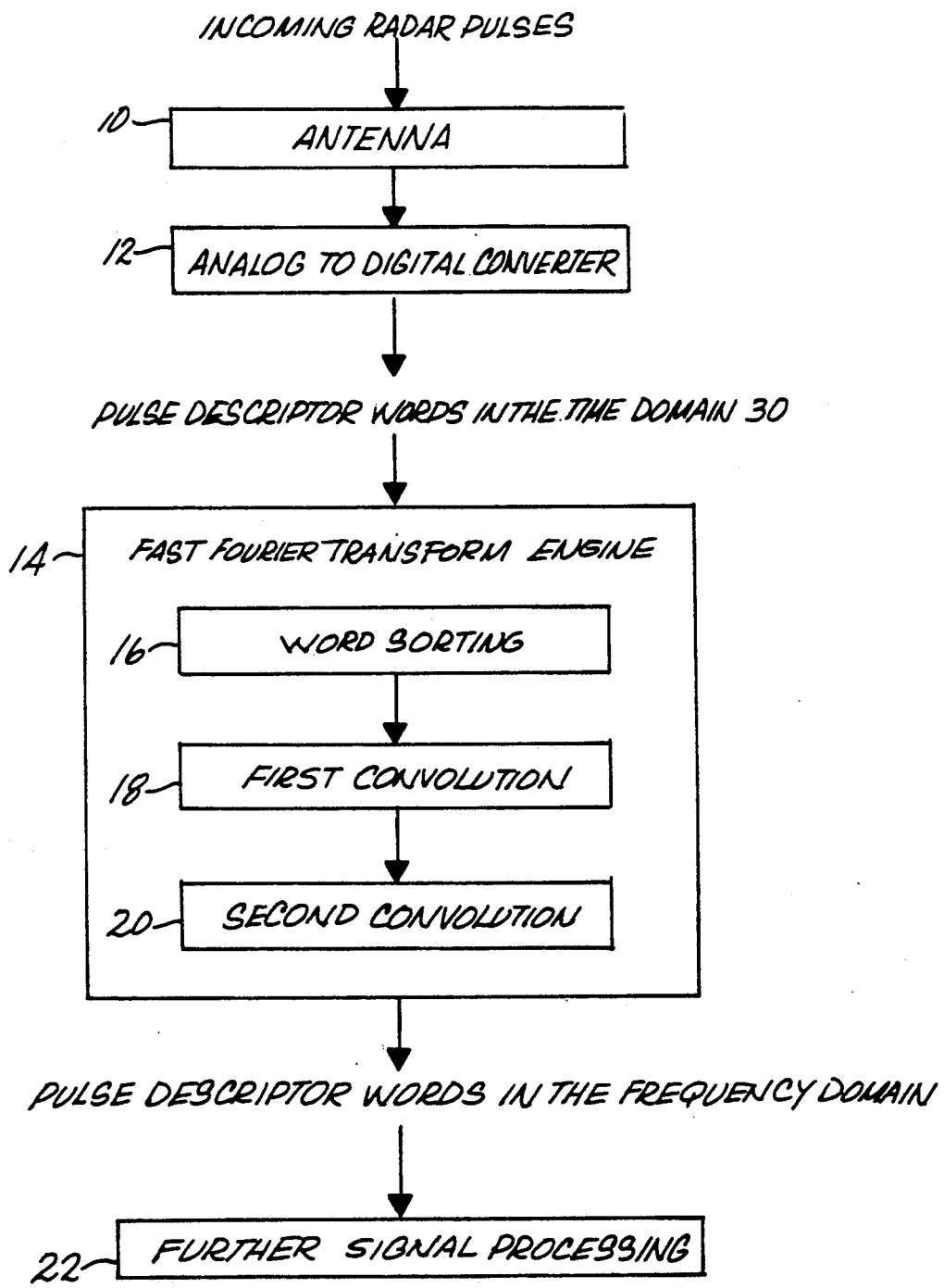
FIG. 1 is a block diagram of a radar receiving and processing system incorporating the present invention.

The present invention applies number theoretic transforms to perform fast fourier transforms in digital signal processing. Fast fourier transforms are used extensively in digital radar among other places. FIG. 1 shows a typical digital radar signal processing system employing the invention.

Radar signals are received as electromagnetic wave pulses by an antenna 10 and converted to analog voltage signals. The method can be easily adapted to other types of signals, for example, sonar and laser signals, by modifying the antenna and the converters. An analog to digital converter 12 samples the analog signal and converts it to digital pulse descriptor words which describe the amplitude of the signal after each sampling interval. The pulse descriptor words can be digitally analyzed in a variety of ways.

The words produced by the analog to digital converter 12 describe the received radar signal pulses as a function of amplitude and time. To completely analyze the signal, however, words describing the frequency of the received signals as a function of time must be generated. This is done by the fast fourier transform engine 14. The output of the fast fourier transform engine 14 is then sent on for further signal processing.

In airborne radar the fast fourier transform engine would be made of specially dedicated digital processing equipment in order to maximize speed but minimize size and weight. However, the same method can be performed on a general purpose computer. Appendix A is a Fortran listing for use in a general purpose computer which simulates the use of the method for radar signal processing.

The fast fourier transforms of the present invention are performed by first, sorting the words 16 so that the words can be conveniently addressed; second, performing a first convolution 18; and third, performing a second convolution 20. After the two convolutions, the group of pulse descriptor words describe the pulses in the frequency domain.

Figure 2:
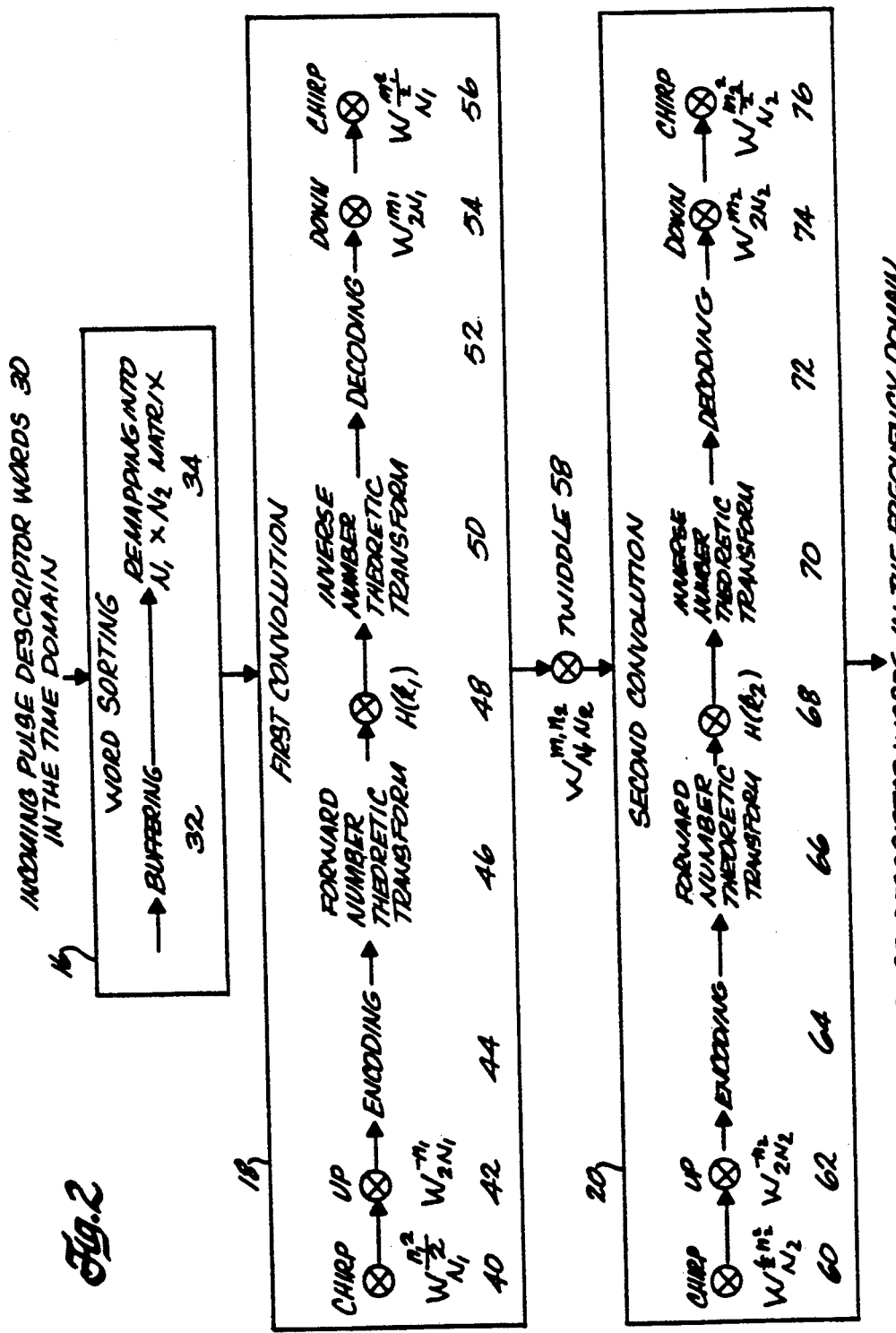
FIG. 2 is a block diagram of the method of the present invention as applied to performing fast fourier transforms.
Figure 3:
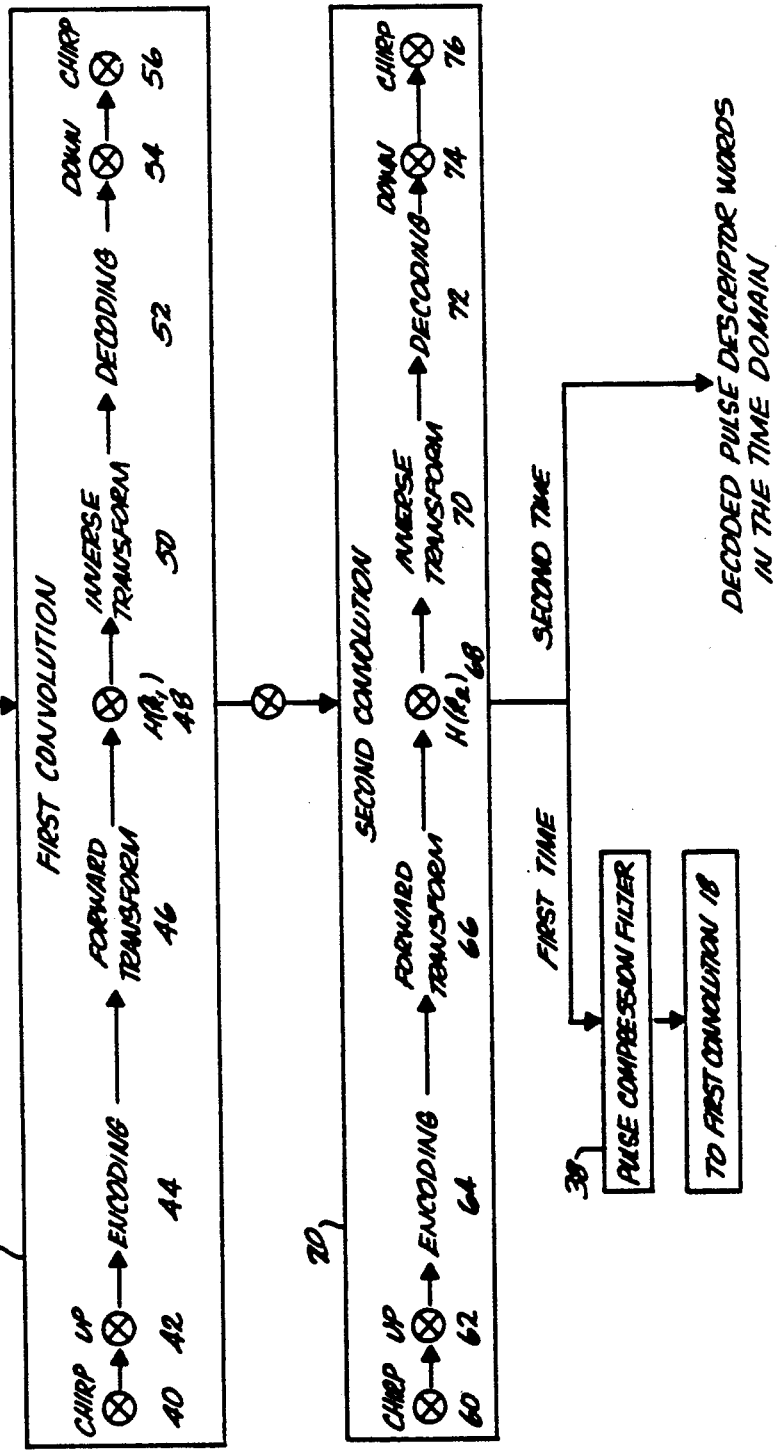
FIG. 3 is a block diagram of the method of the present invention as applied to pulse compression filtering.

Fast fourier transform engines are used in many other ways in digital signal processing, including in doppler filters and in decoding compressed pulses. While these different uses require a slightly different process, the fast fourier transform engine of the present invention is equally well adapted to perform fourier transforms in any of these and other applications. It operates similarly in all cases. FIGS. 2 and 3 show the operation of the present invention in two different applications.

FIG. 2 shows, in block diagram form, the operations required to practice the method of a preferred embodiment of the present invention. This application of a preferred embodiment is similar to that shown in FIG. 1. In this embodiment, incoming pulse descriptor words describe doppler frequencies of radar pulses in the time domain. Each word has two parts. These will be called the real part and the imaginary part, respectively. The parts may correspond to real and imaginary components, or to in-phase and quadrature components, or any other two components of a signal. The invention may be practiced using words with more or fewer parts, but this description is directed to two part words.

In the embodiments of FIGS. 1 and 2, the present invention performs a fast fourier transform, transforming the pulse descriptor words from the time domain to the frequency domain. Performing the same process again transforms the words back into the time domain. In the embodiment of FIG. 3, the invention is adapted to incorporate a pulse compression filter which operates in the frequency domain and then convert the filtered signals back into the time domain.

To perform a fast fourier transform as shown in FIG. 2, the method of the present invention begins with word sorting 16. Word sorting maps the incoming stream of pulse descriptor words into a two-dimensional matrix. As the incoming words are received, they are buffered at step 32 and arranged in rows of $N_2$ words each until $N_1$ rows of $N_2$ words are received. Originally, each word $x(t)$ is identified by the time it was received. That is, $x(0), x(1) \ldots$ identifies words received at time zero ($t=0$), time one ($t=1$), etc. But, after the mapping, each word $x(n_1,n_2)$ can be identified by its row ($n_1$) and its column ($n_2$), e.g., $x(0,0), x(0,1)$ refer to the words in row 1, column 1 and row 1, column 2, respectively. The last word in the matrix was received at time $N_1N_2 (t=N_1N_2)$ with respect to the first word and is identified as $x(N_1-1, N_2-1)$. $N_1$ and $N_2$ remain constant throughout the transform, but have a value equal to a power of 2.

The format of the two-dimensional $N_1 \times N_2$ matrix is shown in Table 1 below. A three, four, or more dimensional matrix may be used instead, if appropriate changes are made in the other steps.

TABLE 1

MAPPING PULSE DESCRIPTOR WORDS INTO $N_1 \times N_2$ MATRIX X

| | $n_2 = 0$ | $n_2 = 1$ | $n_2 = 2$ | $n_2 = 3 \ldots$ | $n_2 = N_2 - 1$ |
|---|---|---|---|---|---|
| $n_1 = 0$ | $x(0)$ | $x(1)$ | $x(2)$ | $x(3) \ldots$ | $x(N_2 - 1)$ |
| $n_1 = 1$ | $x(N_2)$ | $x(N_2 + 1)$ | $x(N_2 + 2)$ | $x(N_2 + 3) \ldots$ | $x(2N_2 - 1)$ |
| $n_1 = 2$ | $x(2N_2) \ldots$ | | | | |
| . | . | | | | |
| . | . | | | | |
| . | . | | | | |
| $n_1 = N_1 - 1$ | $x((N_1 - 1)N_2) \ldots$ | | | | $x(N_1N_2 - 1)$ |

After the remapping, all the terms of the matrix are processed as a group, in parallel. When the processing is completed, a new matrix has been mapped out, and it is processed. The buffer 32 allows incoming words to be held until the preceding matrix is out of the way.

The remapped terms begin with the first convolution 18. The first step 40 is multiplication by a chirp factor. Chirp factors are well known in the art, and, as shown in FIG. 2, the chirp factor for step 40 is $$W_{N_1}^{\frac{1}{2}n1^2} = e^{-j2\pi(\frac{1}{2}n1^2/N_1)}.$$

This term is simply e raised to an exponent which varies for each row as a function of $n_1$. $N_1$ is a constant for each matrix. For example, if 32 words have been mapped into a $4 \times 8$ matrix, then every word in the first row ($n_1 = 0$) of the matrix, $x(0,0)$ through $x(0,7)$ would be multiplied by $$e^{-j2\pi(\frac{1}{2} \cdot 0^2/4)} = 1.$$

Every word in the bottom row, $n_1 = 3$ of the matrix, $x(3,0)$ through $x(3,7)$ would be multiplied by $$e^{-j2\pi(\frac{1}{2} \cdot 3^2/4)} = e^{-j9\pi/4}$$

Next, at step 42, each term is multiplied by a mixing factor. A mixing factor is applied at the beginning, steps 42, 62, and the end, steps 54, 74, of each convolution 18, 20. The beginning mixing factor is called the up factor 42, 62, and the ending mixing factor is called the down factor 54, 74. FIGS. 2 and 3 identify all multiplications using the same notation. The up factor at step 42 is $$W_{2N_1}^{-n1} = e^{-j2\pi(-n1/2N_1)}.$$

The exact value of the up factor for each row varies as a function of $n_1$.

Next, at step 44, the matrix $X(n_1, n_2)$ is encoded into matrix $A(n_1, n_2)$. The process can be described by the following equations:

$$ar(n_1, n_2) = xr(n_1, n_2) - xi(n_1 + \tfrac{1}{2}N_1, n_2), \quad (1)$$
$$0 \le n_1 \le \tfrac{1}{2}N_1 - 1$$

$$ar(n_1, n_2) = xr(n_1, n_2) + xi(n_1 - \tfrac{1}{2}N_1, n_2), \quad (2)$$
$$\tfrac{1}{2}N_1 \le n_1 \le N_1 - 1$$

$$ai(n_1, n_2) = xr(n_1, n_2) + xi(n_1 - \tfrac{1}{2}N_1, n_2), \quad (3)$$
$$0 \le n_1 \le \tfrac{1}{2}N_1 - 1$$

$$ai(n_1, n_2) = xr(n_1, n_2) - xi(n_1 - \tfrac{1}{2}N_1, n_2), \quad (4)$$
$$\tfrac{1}{2}N_1 \le n_1 \le N_1 - 1$$

Equations 1 and 3 are applied to the top half of the matrix, i.e., rows 0 through $\tfrac{1}{2}N_1 - 1$. Equations 2 and 4 are applied to the bottom half of the matrix, i.e., rows $\tfrac{1}{2}N_1$ through $N_1 - 1$. The real part of each word is identified by $xr(n_1, n_2)$, and the imaginary part by $xi(n_1, n_2)$. So, equations 1 and 2 are applied to find the real parts, and equations 3 and 4 are applied to find the imaginary parts of each word in matrix A. After the encoding, the real and imaginary parts of matrix A are not truly real and imaginary, but sums of the original words' parts. However, "real" and "imaginary" will be used to refer to the two parts of each word in the matrix for simplicity.

Using the $4 \times 8$ matrix referred to above as an example, equations 1 and 3 give the values for the first two encoded rows, $n_1 = 0$ and $n_1 = 1$. The real part of the top left-hand word ar(0,0) in the matrix A is the difference between the real part of the top left-hand word xr(0,0) and the imaginary part of the left-hand term of the third row xi(2,0). Similarly, the imaginary term of the encoded top
left-hand word ai(0,0) is given by the sum of the same two terms, xr(0,0)+xi(2,0).

The values for the bottom two rows of the 4×8 matrix, $n_1=2$ and $n_1=3$, are given by equations 2 and 4 so that the real part of the bottom right-hand word of matrix A, $a_r(3,7)$, would be given by the sum of the real term in that place in matrix X, xr(3,7), and the imaginary term in the last row of the top half of matrix X, xi(1,7). The imaginary term, ai(3,7), is given by the difference between the same terms, xr(3,7)−xi(1,7).

After both terms of every word are encoded, the first forward number theoretic transform is performed, step 46. The number theoretic transform in this case is a series of summations down the columns of matrix A. The transformed matrix is called matrix $B(k_1,n_2)$.

$$br(k_1, n_2) = \sum_{n_1=0}^{N_1-1} ar(n_1, n_2)g^{n_1k_1} \text{ modulo } q \quad (5)$$

$$bi(k_1, n_2) = \sum_{n_1=0}^{N_1-1} ai(n_1, n_2)g^{n_1k_1} \text{ modulo } q. \quad (6)$$

where q is the chosen integer field. In this case, $2^{32}+1$ is chosen because of the 32 bit length of the pulse descriptor words. The root g is equal to $2^{64/N_1}$.

Equation 5 gives the values for the real parts of matrix B, and equation 6 gives the values for imaginary parts of matrix B. $k_1$ denotes the rows of the matrix. According to equation 5, to obtain the real part of the top left-hand word of the transformed 4×8 matrix B, for example, br(0,0), the sum is taken of products containing the real part of each term in the left-hand, $n_2=0$, column.

$$br(0, 0) = \sum_{n_1=0}^{N_1-1} ar(n_1, 0) \text{modulo } q$$

Performing the summation for all possible values of $n_1$ for both real and imaginary parts makes the transformation.

The next step 48 is to multiply each term in each column of the transformed matrix $B(k_1,n_2)$ by the corresponding terms of a $1 \times N_1$ matrix, $H(k_1)$. $H(k_1)$ is determined just like $B(k_1,n_2)$ is determined, however, $H(k_1)$ begins with all values equal to 1.

$H(k_1)$ is initially a $1 \times N_1$ matrix, $H(n_1)$, in which every term is equal to 1, i.e., $$hr(n_1) = 1, \quad hi(n_1) = 1, \quad 0 \leq n_1 \leq N_1 - 1. \quad (7)$$

Each term is multiplied by the chirp factor $$W_{N_1}^{-\frac{1}{2}n1^2},$$

and the up factor $$W_{2N_1}^{-n1},$$

as explained above, with respect to the pulse descriptor words. Then, it is encoded according to the following equations:

$$HR(n_1) = hr(n_1) - hi(n_1 + \tfrac{1}{2}N_1), \quad (8)$$
$$0 \leq n_1 \leq \tfrac{1}{2}N_1 - 1$$

$$HR(n_1) = hr(n_1) + hi(n_1 - \tfrac{1}{2}N_1), \quad (9)$$
$$\tfrac{1}{2}N_1 \leq n_1 \leq N_1 - 1$$

$$HI(n_1) = hr(n_1) + hi(n_1 + \tfrac{1}{2}N_1), \quad (10)$$
$$0 \leq n_1 \leq \tfrac{1}{2}N_1 - 1$$

$$HI(n_1) = hr(n_1) - hi(n_1 - \tfrac{1}{2}N_1), \quad (11)$$
$$\tfrac{1}{2}N_1 \leq n_1 \leq N_1 - 1$$

Equations 8-11 are analogous to equations 1-4 and are applied in the same way, except that since $h(k_1)$ is one dimensional, the equations do not contain $n_2$.

Finally, the same number theoretic transform process applied to matrix $A(n_1,n_2)$ is applied to $H(n_1)$, converting it to $H(k_1)$. More specifically, each term is replaced by a sum as follows:

$$HR(k_1) = \sum_{n_1=0}^{N_1-1} HR(n_1)g^{n_1k_1} \text{ modulo } q \quad (12)$$

$$HI(k_1) = \sum_{n_1=0}^{N_1-1} HI(n_1)g^{n_1k_1} \text{ modulo } q \quad (13)$$

Having obtained the two parts for each element in the one dimensional matrix $H(k_1)$, the multiplication step 48 can be performed. Each term in matrix $B(k_1,n_2)$ is multiplied by the term in the one dimensional matrix $H(k_1)$ with the same value for $k_1$. Real parts are multiplied together, and the imaginary parts are multiplied together, but there are no cross products. The same set of values of $H(k_1)$ are applied to every column of matrix $B(k_1,n_2)$. The resulting matrix is called $C(k_1,n_2)$.

Next, the inverse number theoretic transform step 50 is performed on matrix $C(k_1,n_2)$. This step is performed in exactly the same way as the number theoretic transform step 46, except that the exponential factor is raised to a negative power.

In other words, the value of each term in matrix $D(m_1,n_2)$, for $k_1$ ranging from 0 to $N_1-1$, and $n_2$ ranging from 0 to $N_2-1$, is determined according to the following equations:

$$dr(m_1, n_2) = \sum_{k_1=0}^{N_1-1} cr(k_1, n_2)g^{-m_1k_1} \text{ modulo } q \quad (14)$$

$$di(m_1, n_2) = \sum_{k_1=0}^{N_1-1} ci(k_1, n_2)g^{-m_1k_1} \text{ modulo } q \quad (15)$$

At step 52, the resultant matrix $D(m_1,n_2)$ is decoded. The decoding can be described as follows:

$$fr(m_1, n_2) = \tfrac{1}{2}[dr(m_1, n_2) + di(m_1, n_2)], \quad (16)$$
$$0 \leq m_1 \leq N_1 - 1$$

$$fi(m_1, n_2) = \tfrac{1}{2}[dr(m_1 + \tfrac{1}{2}N_1, n_2) - di(m_1 + \tfrac{1}{2}N_1, n_2)], \quad (17)$$
$$0 \leq m_1 \leq \tfrac{1}{2}N_1 - 1$$

$$fi(m_1, n_2) = \tfrac{1}{2}[di(m_1 - \tfrac{1}{2}N_1, n_2) - dr(m_1 - \tfrac{1}{2}N_1, n_2)], \quad (18)$$
$$\tfrac{1}{2}N_1 \leq m_1 \leq N_1 - 1$$

The equations are applied like the equations used to describe the encoding step 44. For example, in the 4×8 matrix discussed above, the top left word d(0,0) is decoded in two steps. The real part fr(0,0) is one-half the sum of dr(0,0)+di(0,0), applying equation 16. The imaginary part, fi(0,0), equals one-half the sum, dr(2,0)−di(2,0), applying equation 17. The bottom right hand word at (3,7) also has two parts: $fr(3,7) = \frac{1}{2}[dr(3,7) + di(3,7)]$; $fi(3,7) = \frac{1}{2}[di(1,7) − dr(1,7)]$. The factor of $\frac{1}{2}$ is a scaling factor with no physical meaning. It is included only to allow the output of this algorithm to equal exactly (not scaled) the output of conventional algorithms.

The first convolution 18 is completed by the final multiplication by a down mixing factor, step 54, and a chirp factor, step 56. These are performed in the same way as the chirp and up multiplications, steps 40, 42. The down multiplication 54 multiplies each term, real and imaginary, by $$W_{2N_1}{}^{m1} = e^{-j2\pi(m1/2N_1)},$$

where $m_1$ depends on the address of the term.

The chirp multiplication 56 is performed by multiplying each term by $$W_{N_1}{}^{\frac{1}{2}m12} = e^{-j2\pi(\frac{1}{2}m12/N_1)}.$$

The next multiplication, step 58, uses a twiddle factor. This factor $$W_{N_1 N_2}{}^{m1n2} = e^{-j2\pi(m1n2/N_1N_2)},$$

varies for every word in the matrix, as it depends on both $m_1$ and $n_2$. Each and every term in the matrix is multiplied by this factor.

The first convolution 18 was based on the columns of the original matrix $X(n_1,n_2)$. The second convolution 20 repeats the steps, applying them to the rows. Since the operations are identical, they will be described only briefly. More information can be obtained by referring to the corresponding step in the discussion above for the first convolution 18.

The process begins with the $N_1 \times N_2$ matrix $F(m_1,n_2)$ after the multiplication steps 54, 56, 58. Each word of the matrix, $f(m_1,n_2)$, has a real part, $fr(m_1,n_2)$, and an imaginary part, $fi(m_1,n_2)$. Again, "real" and "imaginary" are used as a convenience. The first step 60 is multiplication by a chirp factor:

$$W_{N_2}{}^{\frac{1}{2}n22} = e^{-j2\pi(\frac{1}{2}n22/N_2)},$$

which varies as a function of $n_2$, and not $n_1$ as in the corresponding step 40.

The second step, step 62, is multiplication of both parts of every word in matrix F by an up mixing factor.

$$W_{2N_2}{}^{-n2} = e^{-j2\pi(-n2/2N_2)},$$

At step 64, the matrix is encoded. The equations 19–22, below, describe the encoding, using the same conventions as equations 1–4 above.

$$pr(m_1, n_2) = fr(m_1, n_2) − fi(m_1, n_2 + \tfrac{1}{2}N_2), \quad (19)$$
$$0 \leq n_2 \leq \tfrac{1}{2}N_2 − 1$$

$$pr(m_1, n_2) = fr(m_1, n_2) + fi(m_1, n_2 − \tfrac{1}{2}N_2), \quad (20)$$
$$\tfrac{1}{2}N_2 \leq n_2 \leq N_2 − 1$$

$$pi(m_1, n_2) = fr(m_1, n_2) + fi(m_1, n_2 + \tfrac{1}{2}N_2), \quad (21)$$
$$0 \leq n_2 \leq \tfrac{1}{2}N_2 − 1$$

$$pi(m_1, n_2) = fr(m_1, n_2) − fi(m_1, n_2 − \tfrac{1}{2}N_2), \quad (22)$$

$$\tfrac{1}{2}N_2 \leq n_1 \leq N_2 − 1$$

Following this, a forward number theoretic transform is performed, step 66, according to equations 23 and 24. Again, the application of these equations is identical to that described for step 46, equations 5 and 6 above, except that it applies to $n_2$, instead of $n_1$.

$$qr(m_1, k_2) = \sum_{n_2=0}^{N_2-1} pr(m_1, n_2)g^{n2k2} \text{ modulo } q \quad (23)$$

$$qi(m_1, k_2) = \sum_{n_2=0}^{N_2-1} pi(m_1, n_2)g^{n2k2} \text{ modulo } q. \quad (24)$$

Next, at step 68, both parts of every term of the new matrix $Q(m_1,k_2)$ are multiplied by the corresponding terms of a one dimensional matrix $H(k_2)$. The $H(k_2)$ matrix used at step 68 is created identically like the $H(k_1)$ matrix used at step 48, except that it varies as a function of $k_2$ and not $k_1$. Accordingly, corresponding $k_2$ terms are multiplied together, rather than corresponding $k_1$ terms.

Next, step 70, an inverse number theoretic transform is performed. This resembles the transform performed at step 50 and can be described using equations 25 and 26.

$$sr(m_1, m_2) = \sum_{k_2=0}^{N_2-1} qr(m_1, k_2)g^{-k2m2} \text{ modulo } q \quad (25)$$

$$si(m_1, m_2) = \sum_{k_2=0}^{N_2-1} qi(m_1, k_2)g^{-k2m2} \text{ modulo } q. \quad (26)$$

Next, the resulting matrix $S(m_1,m_2)$ is decoded at step 72 according to the equations below.

$$ur(m_1, m_2) = \tfrac{1}{2}[sr(m_1, m_2) + si(m_1, m_2)], \quad (27)$$
$$0 \leq m_2 \leq \tfrac{1}{2}N_2 − 1$$

$$ui(m_1, m_2) = \tfrac{1}{2}[sr(m_1, m_2 + \tfrac{1}{2}N_2) − si(m_1, m_2 + \tfrac{1}{2}N_2)], \quad (28)$$
$$0 \leq m_2 \leq \tfrac{1}{2}N_2 − 1$$

$$ui(m_1, m_2) = \tfrac{1}{2}[si(m_1, m_2 − \tfrac{1}{2}N_2) − sr(m_1, m_2 − \tfrac{1}{2}N_2)], \quad (29)$$
$$\tfrac{1}{2}N_2 \leq m_2 \leq N_2 − 1$$

Finally, both the real and imaginary parts of the resulting $N_1 \times N_2$ matrix $U(m_1,m_2)$ are multiplied by factors which vary as a function of $m_2$. In the down multiply step 74, both parts of each term are multiplied by a down mixing factor $$W_{2N_2}{}^{m2} = e^{-j2\pi(m2/2N_2)}.$$

In the chirp multiply step, both parts of each term are multiplied by a chirp factor $$W_{N_2}{}^{\frac{1}{2}m22} = e^{-j2\pi(\frac{1}{2}m22/N_2)}.$$

That concludes the fourier transform of the original two part pulse descriptor words. The resulting matrix $U(m_1,m_2)$ provides corresponding pulse descriptor words in the frequency domain. The words can be remapped from the matrix to a serial stream, if desired, before being transmitted to further signal processing.

As shown in FIG. 3, the present invention may also be adapted for use with a pulse compression filter. Pulse compression filters are more easily used in the frequency domain, so the pulse descriptor words must be transformed to the frequency domain and then transformed back to the time domain. The embodiment of FIG. 3 can be applied to pulse compression filters which decode any of the standard pulse compression codes. For example, Barker codes, complementary codes, and Frank codes. The steps shown in FIG. 3 are identical to like numbered steps in FIG. 2, but the sequence is modified.

As shown in FIG. 3, incoming pulse descriptor words are sorted by buffering and remapping into an $N_1 \times N_2$ matrix, as in FIG. 2. Then, they undergo a doppler tuning process 36, as is well known in the art. The doppler tuning process 36 matches the pulse compression filter to a limited range of doppler frequencies. Typically, the range is several hundred Hertz. This is necessary for proper operation of the pulse compression filter 38. Other doppler frequency ranges are processed in parallel sequences. After the doppler tuning, the pulses are processed through both convolutions, steps 40-76. The pulses have, at that point, been transformed to the frequency domain, where they can be multiplied by the pulse compression filter 38, as is well known in the art.

After the pulse compression decoding, the pulse descriptor words are routed back through both convolutions, beginning with the chirp factor multiplication 40, to transform the words to the time domain. The resultant output of the last chirp factor multiplication 76 is the compression filtered signals in the time domain.

Alternatively, the output of the pulse compression filter could be routed directly to other signal processing tasks, rather than being routed through the first and second convolutions again. The output in this case would be decoded, or pulse compression filtered, but the pulse descriptor words would be in the frequency domain, as is sometimes required.

The method of the present invention is demonstrated by the Fortran program listing attached as Appendix A. This program enables a general purpose computer to perform the method in computing an FFT and pulse compression on simulated radar pulses and on random numbers. The appendix includes graphs of the output of the program after performing its four simulations.

The method of the present invention substantially reduces the number of multiplications necessary to perform an FFT, as compared to the Cooley-Tukey method commonly used. Table 2 compares the method of the present invention to the Cooley-Tukey method of computing FFTs. Table 2 lists the number of additions and multiplications and the total number of mathematical operations per point required to perform FFTs of various lengths and the pulse compression filter multiply. For a complete pulse compression convolution, the values in Table 2 should be doubled. Length refers to the number of pulse descriptor words processed at one time. For the present invention, as described in the examples above, the length of the FFT is the number of words in the matrix $N_1N_2$.

TABLE 2

| FFT LENGTH | USING NUMBER TRANSFORMS | | | COOLEY-TUKEY | | |
|---|---|---|---|---|---|---|
| | ADDS | MULT | TOT | ADDS | MULT | TOT |
| 8 | 14 | 6 | 20 | 11 | 10 | 21 |
| 16 | 18 | 6 | 24 | 14 | 12 | 26 |
| 32 | 22 | 6 | 28 | 17 | 14 | 31 |
| 64 | 26 | 6 | 32 | 20 | 16 | 36 |
| 128 | 32 | 12 | 44 | 23 | 18 | 41 |
| 256 | 36 | 12 | 48 | 26 | 20 | 46 |
| 512 | 40 | 12 | 52 | 29 | 22 | 51 |
| 1024 | 44 | 12 | 56 | 32 | 24 | 56 |
| 2048 | 48 | 12 | 60 | 35 | 26 | 61 |
| 4096 | 52 | 12 | 64 | 38 | 28 | 66 |

As Table 2 indicates, the total number of operations remains about the same with both methods. However, the number of multiplications is reduced significantly in every case. This substantial reduction in multiplications results in an even greater reduction in the amount of hardware needed to implement the present invention and in the amount of time required to perform the operations. In the construction of airborne radar, especially, it is of great importance to reduce the amount of hardware and the amount of time required for radar signal processing. Very little space is available in an airplane considering the vast amount of computing required for a digital signal processor. Computing speed is of tremendous importance because of the speed of the airplane and its targets. The method of the present invention provides substantial improvements in both.

The method of the present invention is also more accurate than the Cooley-Tukey method. The Cooley-Tukey method requires many multiplications, the results of which must be rounded off to keep the same word size. In the present invention, most of the operations are simple additions which need not be scaled that often. The multiplications are for the W factors, which are rounded off but occur less frequently.

While the present description presents only two exemplary embodiments, it is understood that a wide variety of modifications and adaptations may be performed without departing from the spirit and the scope of the present invention.

APPENDIX

PROGRAM SIMULATION

Four simulations are presented:

1024 point DFT with four sine waves

| NUMBER | FREQ | MAG |
|---|---|---|
| 1 | 46.5 | 3.0 |
| 2 | 260.0 | 10.0 |
| 3 | 533.0 | 7.0 |
| 4 | 781.2 | 4.0 |

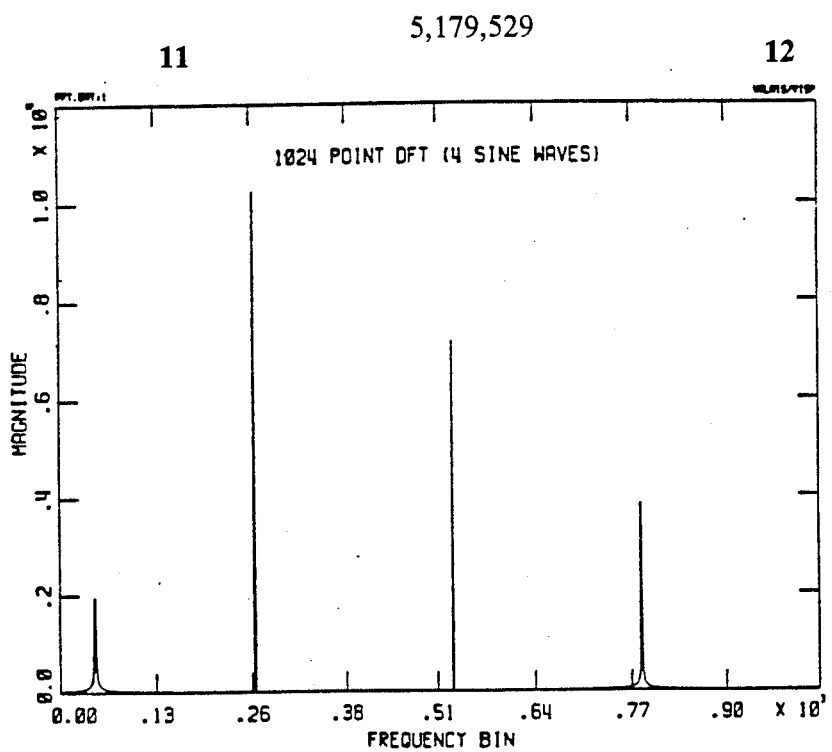
FIGURE A
1024 POINT DFT
2) 13 bit Barker Code with target in range bin 50
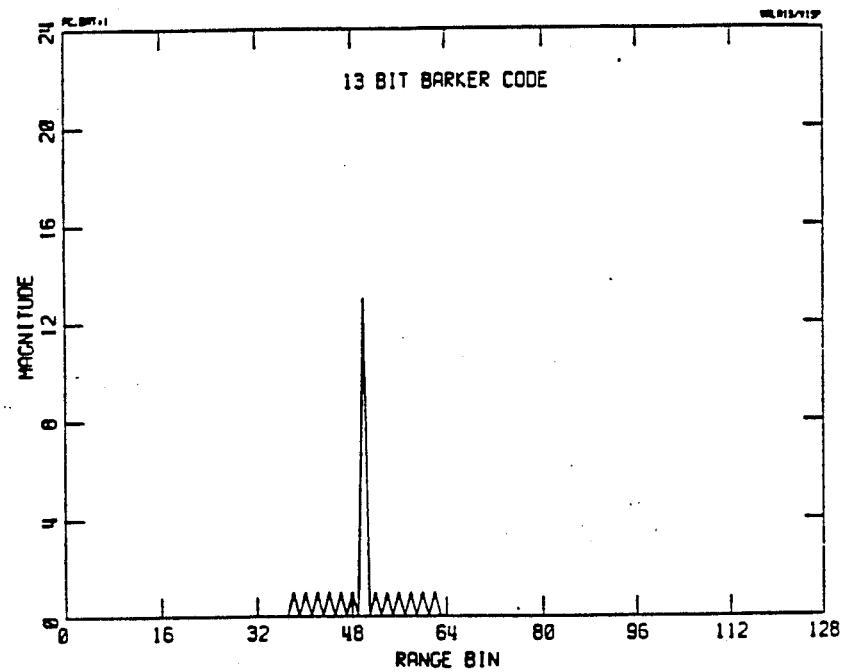
FIGURE B
13 BIT BARKER CODE

024 bit Complementary Code (A+B) with 6 targets
| NUMBER | RANGE BIN | MAG |
|--------|-----------|------|
| 1 | 34 | 4.0 |
| 2 | 145 | 20.0 |
| 3 | 241 | 12.0 |
| 4 | 312 | 32.0 |
| 5 | 400 | 10.0 |
| 6 | 456 | 5.0 |
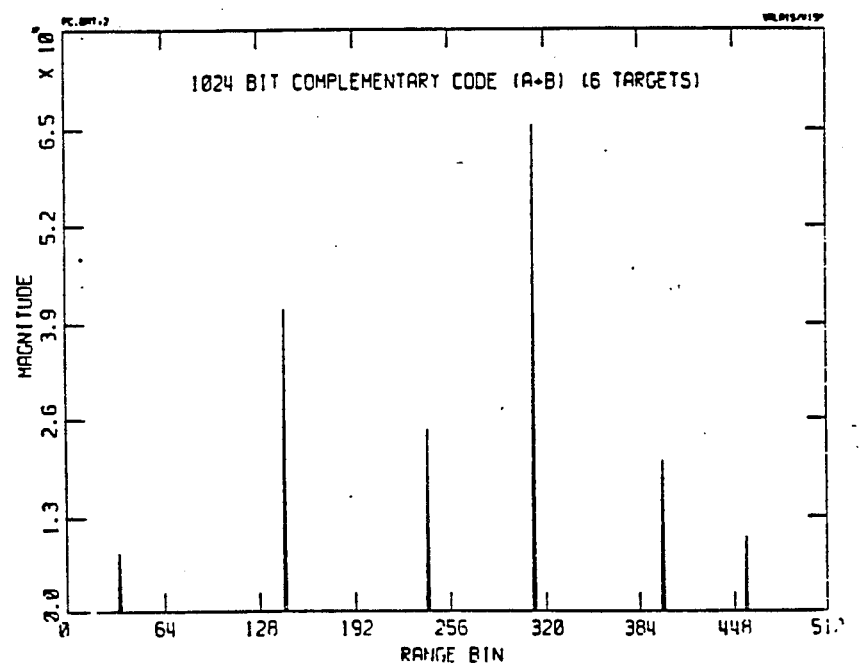
FIGURE C
1024 BIT COMPLEMENTARY
81 bit Frank Code with target in range bin 100

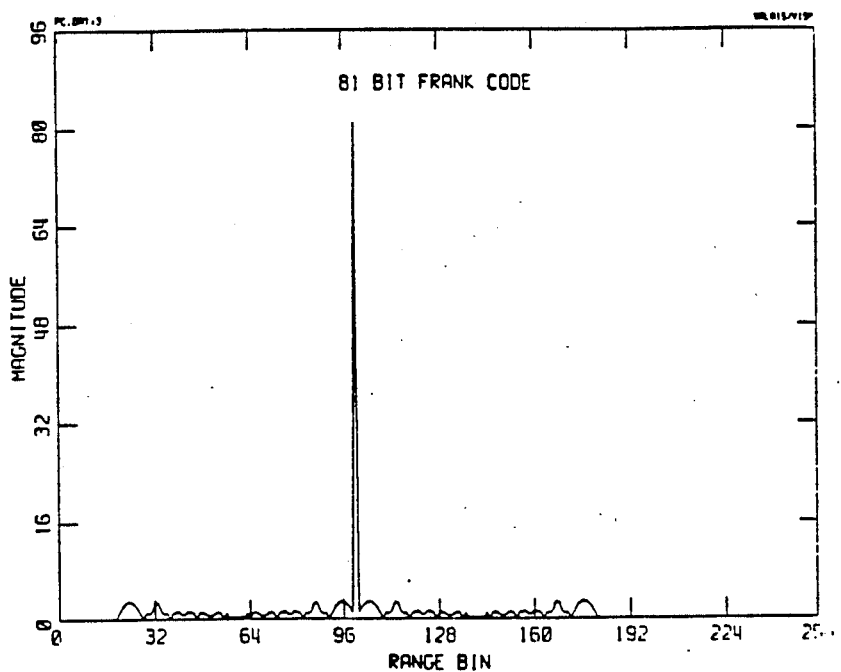

**FIGURE D
81 BIT FRANK CODE**

```
        WRITE(6,10)
        WRITE(6,20)
        WRITE(6,30)
        WRITE(6,40)
        WRITE(6,50)
        WRITE(6,60)
        FORMAT(1X,'1 DIMENSIONAL FOURIER TRANS      1')
        FORMAT(1X,'1 DIMENSIONAL CONVOLUTION        2')
        FORMAT(1X,'1 DIMENSIONAL CORRELATION        3')
        FORMAT(1X,'2 DIMENSIONAL FOURIER TRANS      4')
        FORMAT(1X,'2 DIMENSIONAL CONVOLUTION        5')
        FORMAT(1X,'2 DIMENSIONAL CORRELATION        6')

ACCEPT 70, NMODE
        FORMAT(I6)

IF(NMODE.EQ.1) CALL ONEDIMFFT
        IF(NMODE.EQ.2) CONTINUE
        IF(NMODE.EQ.3) CALL ONEDIMCOR
        IF(NMODE.EQ.4) CONTINUE
        IF(NMODE.EQ.5) CONTINUE
        IF(NMODE.EQ.6) CONTINUE

END
*===========================================================================

SUBROUTINE ONEDIMFFT

REAL*8 XR(0:4096),XI(0:4096)
        REAL*8 YR(0:4096),YI(0:4096)
        REAL*8 FMAX,XT,YT,ERR,XERR,XMAGIN,XMAGOUT,YMAGIN,YMAGOUT,XMAG

OPEN(UNIT=27,STATUS='NEW',FILE='FFT.DAT')

WRITE(6,10)
)       FORMAT(1X,'INPUT LENGTH OF TRANSFORM (POWER OF 2)')
        ACCEPT 20, N1
)       FORMAT(I6)
```

```
      WRITE(6,30)
    ) FORMAT(1X,'IS INPUT RANDOM(=0) OR A SINE WAVE(=1)')
      ACCEPT 20, NINPUT

WRITE(6,40)
    ) FORMAT(1X,'WRITE OUTPUT TO DATA FILE (=1)')
      ACCEPT 20, NWRITE

N=2**N1
      ISEED=196734

IF(NINPUT.EQ.0) CALL RAND(XR,N,ISEED)
      IF(NINPUT.EQ.0) CALL RAND(XI,N,ISEED)
      IF(NINPUT.EQ.1) CALL SINE(XR,XI,N)

DO 50 J50=0,N-1
      YR(J50)=XR(J50)
      YI(J50)=XI(J50)
    ) CONTINUE

XMAGIN=0.0D+00
      YMAGIN=0.0D+00
      DO 60 J60=0,N-1
      XMAGIN=XMAGIN+(XR(J60)**2.0+XI(J60)**2.0)
      YMAGIN=YMAGIN+(YR(J60)**2.0+YI(J60)**2.0)
    ) CONTINUE

CALL FFT1DN(XR,XI,N1,1)

CALL FFT1DO(YR,YI,N1,N,1)

XMAGOUT=0.0D+00
      YMAGOUT=0.0D+00
      DO 70 J70=0,N-1
      XMAGOUT=XMAGOUT+(XR(J70)**2.0+XI(J70)**2.0)
      YMAGOUT=YMAGOUT+(YR(J70)**2.0+YI(J70)**2.0)
 70   CONTINUE

XMAGOUT=XMAGOUT/DFLOAT(N)
      YMAGOUT=YMAGOUT/DFLOAT(N)

IF(NWRITE.NE.1) GOTO 80

DO 90 J90=0,N-1
      XMAG=DSQRT(XR(J90)**2.0D+00+XI(J90)**2.0D+00)
      WRITE(27,100) J90,XMAG
100   FORMAT(1X,I6,F15.5)
 90   CONTINUE

C     ************************************************************
C     *                                                          *
C     *   COMPARE OUTPUT FROM TWO ALGORITHMS TO MAKE SURE THEY AGREE   *
C     *                                                          *
C     ************************************************************

80   IERR=0
      XERR=0.0D+00
      FMAX=0.0D+00
      XT=0.0D+00
      YT=0.0D+00

DO 110 J110=0,N-1
      ERR=DABS(YR(J110)-XR(J110))
      XERR=XERR+ERR**2.0D+00
      IF(ERR.GT.0.5D+00) IERR=1
      IF(ERR.GT.FMAX) XT=XR(J110)
      IF(ERR.GT.FMAX) YT=YR(J110)
      IF(ERR.GT.FMAX) FMAX=ERR
      ERR=DABS(YI(J110)-XI(J110))
      XERR=XERR+ERR**2.0D+00
      IF(ERR.GT.0.5D+00) IERR=1
```

```
      IF(ERR.GT.FMAX) XT=XI(J110)
      IF(ERR.GT.FMAX) YT=YI(J110)
      IF(ERR.GT.FMAX) FMAX=ERR
110   CONTINUE

WRITE(6,120) N
120   FORMAT(1X,'SEQUENCE LENGTH IS ',I6)

WRITE(6,130) FMAX
130   FORMAT(1X,'MAXIMUM ERROR IS          ',F40.30)

WRITE(6,140) YT
140   FORMAT(1X,'BUTTERFLY METHOD IS       ',F40.30)
      WRITE(6,150) XT
150   FORMAT(1X,'NUMBER TRANSFORM METHOD IS ',F40.30)
      IF(IERR.EQ.0) GOTO 170

WRITE(6,160)
160   FORMAT(1X,'SEQUENCES DID NOT MATCH')
      GOTO 190

170   WRITE(6,180)
180   FORMAT(1X,'BOTH SEQUENCES MATCHED')

190   WRITE(6,200) XMAGIN,XMAGOUT
200   FORMAT(1X,'MAGNITUDE IN IS ',F25.5,', MAGNITUDE OUT IS',F25.5/)

WRITE(6,200) YMAGIN,YMAGOUT

XERR=10.0D+00*DLOG10(YMAGOUT/XERR)

WRITE(6,210) XERR
210   FORMAT(1X,'SIGNAL TO NOISE RATIO IS ',F10.5,' dB')

CLOSE(UNIT=27)

END
C----------------------------------------------------------------------

SUBROUTINE ONEDIMCOR

REAL*8 XR(0:4096),XI(0:4096),HR(0:4096),HI(0:4096)
      REAL*8 XRB(0:4096),XIB(0:4096),HRB(0:4096),HIB(0:4096)
      REAL*8 XMAG(512)
      INTEGER*2 NBIN(512)

OPEN(UNIT=20,STATUS='NEW',FILE='PC.DAT')

WRITE(6,10)
10    FORMAT(1X,'BARKER(=0), COMPLEMENTARY(=1), FRANK(=2)')
      ACCEPT 20, NCODE
20    FORMAT(I6)

WRITE(6,30)
30    FORMAT(1X,'INPUT CODE LENGTH')
      ACCEPT 20, NLENGTH

WRITE(6,40)
40    FORMAT(1X,'INPUT NUMBER OF RANGE BINS')
      ACCEPT 20, NRANGE

WRITE(6,50)
50    FORMAT(1X,'WRITE DATA TO FILE (=1)')
      ACCEPT 20, NWRITE

IF(NCODE.EQ.0) CALL BARKER(HR,HI,NLENGTH)
      IF(NCODE.EQ.1) CALL COMP(HR,HI,HRB,HIB,NLENGTH)
      IF(NCODE.EQ.2) CALL FRANK(HR,HI,NLENGTH)

CALL RANGE(XR,XI,HR,HI,NLENGTH,NRANGE,N1,1,XMAG,NBIN,NTARGET)
```

```
        N=2**N1

CALL FFT1DN(XR,XI,N1,1)
        CALL FFT1DN(HR,HI,N1,1)

CALL TRANSMULT(XR,XI,HR,HI,N1)

CALL FFT1DN(XR,XI,N1,-1)

IF(NCODE.NE.1) GOTO 75

CALL RANGE(XRB,XIB,HRB,HIB,NLENGTH,NRANGE,N1,2,XMAG,NBIN,NTARGET)

CALL FFT1DN(XRB,XIB,N1,1)
        CALL FFT1DN(HRB,HIB,N1,1)

CALL TRANSMULT(XRB,XIB,HRB,HIB,N1)

CALL FFT1DN(XRB,XIB,N1,-1)

75      IF(NWRITE.NE.1) GOTO 60

DO 70 J70=0,NRANGE-1
        IF(NCODE.EQ.2) XR(J70)=DSQRT(XR(J70)**2.0D+00+XI(J70)**2.0D+00)
        IF(NCODE.NE.1) WRITE(20,80) J70,XR(J70)
        IF(NCODE.EQ.1) WRITE(20,80) J70,XR(J70)+XRB(J70)
80      FORMAT(1X,I6,F15.5)
70      CONTINUE

60      CONTINUE

RETURN

END
C***************************************************************
        SUBROUTINE BARKER(HR,HI,NLENGTH)
C       ***************************************************************
C       *                                                             *
C       *        THIS SUBROUTINE CREATES BARKER CODES                 *
C       *                                                             *
C       ***************************************************************

REAL*8 HR(0:4096),HI(0:4096)

DO 10 J10=0,NLENGTH-1
        HR(J10)=1.0D+00
        HI(J10)=0.0D+00
10      CONTINUE

IF(NLENGTH.NE.2) GOTO 20
        HR(1)=-1.0D+00
        GOTO 30

20      IF(NLENGTH.NE.3) GOTO 40
        HR(2)=-1.0D+00
        GOTO 30

40      IF(NLENGTH.NE.4) GOTO 50
        HR(2)=-1.0D+00
        GOTO 30

50      IF(NLENGTH.NE.5) GOTO 60
        HR(3)=-1.0D+00
        GOTO 30

60      IF(NLENGTH.NE.7) GOTO 70
        HR(3)=-1.0D+00
        HR(4)=-1.0D+00
        HR(6)=-1.0D+00
        GOTO 30
```

```
70    IF(NLENGTH.NE.11) GOTO 80
      HR(3)=-1.0D+00
      HR(4)=-1.0D+00
      HR(5)=-1.0D+00
      HR(7)=-1.0D+00
      HR(8)=-1.0D+00
      HR(10)=-1.0D+00
      GOTO 30

80    IF(NLENGTH.NE.13) GOTO 90

HR(5)=-1.0D+00
      HR(6)=-1.0D+00
      HR(9)=-1.0D+00
      HR(11)=-1.0D+00
      GOTO 30

90    WRITE(6,100)
100   FORMAT(1X,'ILLEGAL BARKER CODE')

30    CONTINUE

RETURN

END

C****************************************************************

SUBROUTINE COMP(HRA,HIA,HRB,HIB,NLENGTH)

C     ****************************************************************
C     *                                                              *
C     *        THIS SUBROUTINE CREATES COMPLEMENTARY CODES           *
C     *                                                              *
C     ****************************************************************

REAL*8 HRA(0:4096),HIA(0:4096),HRB(0:4096),HIB(0:4096),FX
      INTEGER*2 A(0:4096),B(0:4096)

FX=DLOG10(2.0D+00)
      FX=DLOG10(DFLOAT(NLENGTH))/FX

IF(DINT(FX).NE.FX) WRITE(6,10)
10    FORMAT(1X,'CODE LENGTH HAS TO BE A POWER OF 2')
      IF(DINT(FX).NE.FX) GOTO 20

N1=IIDNNT(FX)

DO 30 J30=0,3
      WRITE(6,40) J30+1
40    FORMAT(1X,'WHAT IS SEED A',I1)
      ACCEPT 50, A(J30)
50    FORMAT(I6)
30    CONTINUE

DO 60 J60=0,3
      WRITE(6,70) J60+1
70    FORMAT(1X,'WHAT IS SEED B',I1)
      ACCEPT 50, B(J60)
60    CONTINUE

DO 80 J80=1,N1-2
      N=2**(J80+1)
      DO 90 J90=0,N-1
      A(J90+N)=B(J90)
      B(J90+N)=-B(J90)
      B(J90)=A(J90)
90    CONTINUE
80    CONTINUE

DO 100 J100=0,NLENGTH-1
```

```fortran
            HRA(J100)=DFLOAT(A(J100))
            HIA(J100)=0.0D+00
            HRB(J100)=DFLOAT(B(J100))
            HIB(J100)=0.0D+00
100     CONTINUE

20      CONTINUE

RETURN

END

C*********************************************************************

SUBROUTINE FRANK(HR,HI,NLENGTH)

C       *********************************************************
C       *                                                       *
C       *         THIS SUBROUTINE CREATES FRANK CODES            *
C       *                                                       *
C       *********************************************************

REAL*8 HR(0:4096),HI(0:4096),FX,PI,DEL,DELPH,ANG

FX=DSQRT(DFLOAT(NLENGTH))
        IF(DNINT(FX).NE.FX) WRITE(6,10)
10      FORMAT(1X,'ERROR IN CODE LENGTH (MUST BE PERFECT SQUARE)')
        IF(DNINT(FX).NE.FX) GOTO 20

N1=IIDNNT(FX)
        PI=4.0D+00*DATAN(1.0D+00)
        DEL=2.0D+00*PI/DFLOAT(N1)

DO 30 J30=0,N1-1
        DELPH=DFLOAT(J30)*DFLOAT(N1-1)*DEL
        DO 40 J40=0,N1-1
        ANG=DFLOAT(J40)*DELPH
        ANG=ANG-2.0D+00*PI*DINT(ANG/(2.0D+00*PI))

HR(N1*J30+J40)=DCOS(ANG)
        HI(N1*J30+J40)=DSIN(ANG)
40      CONTINUE
30      CONTINUE

20      CONTINUE

RETURN

END

C*********************************************************************

SUBROUTINE RANGE(XR,XI,HR,HI,NLENGTH,NRANGE,N1,J1,XMAG,NBIN,NTARGET

C       *********************************************************
C       *                                                       *
C       *        THIS SUBROUTINE CREATES THE RADAR RETURN        *
C       *                                                       *
C       *********************************************************

REAL*8 XR(0:4096),XI(0:4096),HR(0:4096),HI(0:4096)
        REAL*8 XMAG(512),HRT(0:4096),HIT(0:4096),FX
        INTEGER*2 NBIN(512)

IF(J1.EQ.2) GOTO 10

WRITE(6,20)
20      FORMAT(1X,'HOW MANY TARGETS')
        ACCEPT 30, NTARGET
30      FORMAT(I6)
```

```
        DO 40 J40=1,NTARGET
        WRITE(6,50) J40
50      FORMAT(1X,'WHAT RANGE BIN IS TARGET NUMBER ',I5,' IN')
        ACCEPT 30, NBIN(J40)

WRITE(6,60) J40
60      FORMAT(1X,'WHAT IS AMPLITUDE OF TARGET NUMBER ',I5)
        ACCEPT 70, XMAG(J40)
70      FORMAT(F15.5)
40      CONTINUE

10      FX=DLOG10(2.0D+00)
        FX=DLOG10(DFLOAT(NLENGTH+NRANGE-1))/FX

N1=IIDNNT(FX)
        IF(DFLOAT(N1).LT.FX) N1=N1+1
        N=2**N1

DO 80 J80=0,N-1
        XR(J80)=0.0D+00
        XI(J80)=0.0D+00
80      CONTINUE

DO 90  J90=1,NTARGET
        DO 100 J100=0,NLENGTH-1
        LBIN=NBIN(J90)+J100
        IF(LBIN.LT.0.OR.LBIN.GT.NRANGE+NLENGTH-2) GOTO 100
        XR(LBIN)=XR(LBIN)+XMAG(J90)*HR(J100)
        XI(LBIN)=XI(LBIN)+XMAG(J90)*HI(J100)
100     CONTINUE
90      CONTINUE

DO 110 J110=1,NLENGTH-1
        HRT(N-J110)= HR(J110)
        HIT(N-J110)=-HI(J110)
110     CONTINUE

DO 120 J120=NLENGTH,N-1
        HRT(N-J120)=0.0D+00
        HIT(N-J120)=0.0D+00
120     CONTINUE

HI(0)=-HI(0)

DO 130 J130=1,N-1
        HR(J130)=HRT(J130)
        HI(J130)=HIT(J130)
130     CONTINUE

RETURN

END

C************************************************************************

SUBROUTINE TRANSMULT(XR,XI,HR,HI,N1)

C       ****************************************************************
C       *                                                              *
C       *        THIS SUBROUTINE PERFORMS THE POINT BY POINT           *
C       *     MULTIPLY OF THE TRANSFORM OF THE PULSE COMPRESSION       *
C       *       FILTER WITH THE TRANSFORM OF THE RADAR RETURN          *
C       *                                                              *
C       ****************************************************************

REAL*8 XR(0:4096),XI(0:4096),HR(0:4096),HI(0:4096),YR,YI

N=2**N1
        DO 10 J10=0,N-1
        YR=XR(J10)*HR(J10)-XI(J10)*HI(J10)
        YI=XR(J10)*HI(J10)+XI(J10)*HR(J10)
        XR(J10)=YR
```

```
        XI(J10)=YI
10   CONTINUE

RETURN

END

C*********************************************************************

SUBROUTINE RAND(X,N,ISEED)

C    *****************************************************************
C    *
C    *        THIS SUBROUTINE CALCULATES A RANDOM SEQUENCE
C    *
C    *****************************************************************

REAL*8 X(0:4096)

DO 10 J10=0,N-1
     X(J10)=RAN(ISEED)
10   CONTINUE

RETURN

END

C*********************************************************************

SUBROUTINE SINE(XR,XI,N)

C    *****************************************************************
C    *
C    *        THIS SUBROUTINE PRODUCES A WAVEFORM WITH A SERIES
C    *                       OF SINE WAVES
C    *
C    *****************************************************************

REAL*8 XR(0:4096),XI(0:4096),MAG(128),FREQ(128),ANG,PI

PI=4.0D+00*DATAN(1.0D+00)

C    *****************************************************************
C    *
C    *        INPUT FREQUENCIES AND MAGNITUDES FOR SINE WAVE INPUT
C    *
C    *****************************************************************

WRITE(6,10)
10   FORMAT(1X,'HOW MANY FREQUENCIES ARE THERE')
     ACCEPT 20, NUM
20   FORMAT(I6)
     DO 30 J30=1,NUM
     WRITE(6,40) J30
40   FORMAT(1X,'WHAT IS FREQUENCY NUMBER',I6)
     ACCEPT 50, FREQ(J30)
50   FORMAT(F15.5)
     WRITE(6,60) J30
60   FORMAT(1X,'WHAT IS THE MAGNITUDE OF FREQUENCY NUMBER',I6)
     ACCEPT 50, MAG(J30)
30   CONTINUE

DO 70 J70=0,N-1
     XR(J70)=0.0D+00
     XI(J70)=0.0D+00
     DO 80 J80=1,NUM
     ANG=2.0D+00*PI*FREQ(J80)*DFLOAT(J70)/DFLOAT(N)
     XR(J70)=XR(J70)+MAG(J80)*DCOS(ANG)
     XI(J70)=XI(J70)+MAG(J80)*DSIN(ANG)
80   CONTINUE
70   CONTINUE
```

RETURN

END

C====================================================================

```
      SUBROUTINE FFT1DN(XR,XI,N1,J1)
```

C ===================================================================
C *                                                                 *
C *       THIS SUBROUTINE IS A COMPUTER SIMULATION OF A NEW         *
C *                       FFT ALGORITHM                             *
C *                                                                 *
C ===================================================================

```
      REAL*8 XR(0:4096),XI(0:4096),YR(0:64,0:64),YI(0:64,0:64)
      REAL*8 PI,XN,X21,X22,ANG,X10,YRT,YIT,HR(0:64),HI(0:64)
      REAL*8 SCAL(6),SCA1,SCA2,SCA
      INTEGER*2 NBITH(6),NBITX(6)
```

C ===================================================================
C *                                                                 *
C *       PARAMETERS USED TO COMPUTE MODIFIED CHIRP TRANSFORM       *
C *                                                                 *
C ===================================================================

```
      SCAL(3)=0.75061D+00
      SCAL(4)=0.87482D+00
      SCAL(5)=0.91486D+00
      SCAL(6)=0.91668D+00

NBITH(3)=14
      NBITH(4)=15
      NBITH(5)=13
      NBITH(6)=14
      NBITX(3)=19
      NBITX(4)=17
      NBITX(5)=18
      NBITX(6)=16
```

C ===================================================================
C *                                                                 *
C *          PARAMETERS THAT DETERMINE LENGTH OF EACH               *
C *                    DIMENSION IN ARRAY                           *
C *                                                                 *
C ===================================================================

```
      IF(N1.EQ.3)   N11=3
      IF(N1.EQ.4)   N11=4
      IF(N1.EQ.5)   N11=5
      IF(N1.EQ.6)   N11=6
      IF(N1.EQ.7)   N11=4
      IF(N1.EQ.8)   N11=4
      IF(N1.EQ.9)   N11=5
      IF(N1.EQ.10)  N11=5
      IF(N1.EQ.11)  N11=6
      IF(N1.EQ.12)  N11=6
      N12=N1-N11

N  =2**N1
      N21=2**N11
      N22=2**N12
```

C ===================================================================
C *                                                                 *
C *       IF PERFORMING INVERSE FFT TAKE COMPLEX CONJUGATE          *
C *     OF INPUT SAMPLES AND MAP ONE DIMENSIONAL ARRAY INTO         *
C *                 A TWO DIMENSIONAL ARRAY                         *
C *                                                                 *
C ===================================================================

```
      DO 10 J10=0,N21-1
      DO 20 J20=0,N22-1
      YR(J10,J20)=XR(N22*J10+J20)
      YI(J10,J20)=DFLOAT(J1)*XI(N22*J10+J20)
20    CONTINUE
10    CONTINUE

PI=4.0D+00*DATAN(1.0D+00)
      NSCALE=0

C     ****************************************************************
C     *                                                              *
C     *          PERFORM FIRST COMPLEX MULTIPLICATION                *
C     *                                                              *
C     ****************************************************************

XN =DFLOAT(2*N21)
      DO 30 J30=0,N21-1
      X10=DFLOAT(J30**2-J30)
      X10=X10-XN*DINT(X10/XN)
      ANG=2.0D+00*PI*X10/XN
      DO 40 J40=0,N22-1
      YRT=YR(J30,J40)*DCOS(ANG)+YI(J30,J40)*DSIN(ANG)
      YIT=YI(J30,J40)*DCOS(ANG)-YR(J30,J40)*DSIN(ANG)
      YR(J30,J40)=YRT
      YI(J30,J40)=YIT
40    CONTINUE
30    CONTINUE

C     ****************************************************************
C     *                                                              *
C     *     PERFORM LENGTH N21 POLYNOMIAL PRODUCT MODULO (Z**N21+1)   *
C     *     OF EACH LENGTH N21 ARRAY WITH THE MODIFIED CHIRP TRANSFORM*
C     *                                                              *
C     ****************************************************************

CALL COEF(HR,HI,N11,SCAL,NBITH,SCA1)

CALL SCALE(YR,YI,N11,N12,NBITX,NSCALE,1)

DO 50 J50=0,N22-1
      DO 60 J60=0,N21-1
      XR(J60)=YR(J60,J50)
      XI(J60)=YI(J60,J50)
60    CONTINUE

CALL DFT(XR,XI,HR,HI,N11)

DO 70 J70=0,N21-1
      YR(J70,J50)=XR(J70)
      YI(J70,J50)=XI(J70)
70    CONTINUE
50    CONTINUE

C     ****************************************************************
C     *                                                              *
C     *          PERFORM SECOND COMPLEX MULTIPLICATION               *
C     *                                                              *
C     ****************************************************************

XN =DFLOAT(2*N)
      X21=DFLOAT(N21)
      X22=DFLOAT(N22)
      DO 80 J80=0,N21-1
      DO 90 J90=0,N22-1
      X10=X22*DFLOAT(J80**2+J80)+X21*DFLOAT(J90**2-J90)+DFLOAT(2*J80*J90)
      X10=X10-XN*DINT(X10/XN)
      ANG=2.0D+00*PI*X10/XN
      YRT=YR(J80,J90)*DCOS(ANG)+YI(J80,J90)*DSIN(ANG)
      YIT=YI(J80,J90)*DCOS(ANG)-YR(J80,J90)*DSIN(ANG)
```

```
      YR(J80,J90)=YRT
      YI(J80,J90)=YIT
  90  CONTINUE
  80  CONTINUE

C     *==================================================================
C     *
C     *    PERFORM LENGTH N22 POLYNOMIAL PRODUCT MODULO (Z**N22+1)
C     *    OF EACH LENGTH N22 ARRAY WITH THE MODIFIED CHIRP TRANSFORM
C     *
C     *==================================================================

IF(N22.EQ.1) GOTO 100

CALL COEF(HR,HI,N12,SCAL,NBITH,SCA2)

CALL SCALE(YR,YI,N11,N12,NBITX,NSCALE,2)

DO 110 J110=0,N21-1
      DO 120 J120=0,N22-1
      XR(J120)=YR(J110,J120)
      XI(J120)=YI(J110,J120)
 120  CONTINUE

CALL DFT(XR,XI,HR,HI,N12)

DO 130 J130=0,N22-1
      YR(J110,J130)=XR(J130)
      YI(J110,J130)=XI(J130)
 130  CONTINUE
 110  CONTINUE

C     *==================================================================
C     *
C     *              PERFORM THIRD COMPLEX MULTIPLICATION
C     *
C     *==================================================================

XN=DFLOAT(2*N22)
      DO 140 J140=0,N22-1
      X10=DFLOAT(J140**2+J140)
      X10=X10-XN*DINT(X10/XN)
      ANG=2.0D+00*PI*X10/XN
      DO 150 J150=0,N21-1
      YRT=YR(J150,J140)*DCOS(ANG)+YI(J150,J140)*DSIN(ANG)
      YIT=YI(J150,J140)*DCOS(ANG)-YR(J150,J140)*DSIN(ANG)
      YR(J150,J140)=YRT
      YI(J150,J140)=YIT
 150  CONTINUE
 140  CONTINUE

100  IF(N22.EQ.1) SCA2=1.0D+00
      SCA=2.0D+00**DFLOAT(NSCALE)
      DO 160 J160=0,N21-1
      DO 170 J170=0,N22-1
      YR(J160,J170)=SCA*YR(J160,J170)/(SCA1*SCA2)
      YI(J160,J170)=SCA*YI(J160,J170)/(SCA1*SCA2)
 170  CONTINUE
 160  CONTINUE

XN=DFLOAT(N)
      IF(J1.EQ.1) XN=1.0D+00

C     *==================================================================
C     *
C     *         IF PERFORMING AN INVERSE DFT TAKE THE COMPLEX
C     *     CONJUGATE AND DIVIDE BY N AND ALSO MAP TWO DIMENSIONAL ARRAY
C     *                  INTO A ONE DIMENSIONAL ARRAY
C     *
C     *==================================================================
```

```
      DO 180 J180=0,N21-1
      DO 190 J190=0,N22-1
      XR(J180+N21*J190)=YR(J180,J190)/XN
      XI(J180+N21*J190)=DFLOAT(J1)*YI(J180,J190)/XN
190   CONTINUE
180   CONTINUE

RETURN

END

C**********************************************************************
      SUBROUTINE DFT(XR,XI,HR,HI,N1)

C     ****************************************************************
C     *
C     *     THIS SUBROUTINE PERFORMS A LENGTH N POLYNOMIAL PRODUCT
C     *     MODULO (Z**N+1) WITH THE MODIFIED CHIRP TRANSFORM
C     *
C     ****************************************************************

REAL*8 XR(0:4096),XI(0:4096),HR(0:64),HI(0:64)

N=2**N1

CALL ADD(XR,XI,N)

CALL POLYPROD(XR,HR,N1,1)
      CALL POLYPROD(XI,HI,N1,0)

CALL INVADD(XR,XI,N)

RETURN

END

C**********************************************************************
      SUBROUTINE COEF(HR,HI,N1,SCAL,NBIT,SCA)

C     ****************************************************************
C     *
C     *     THIS SUBROUTINE COMPUTES THE MODIFIED CHIRP TRANSFORM
C     *
C     ****************************************************************

REAL*8 HR(0:64),HI(0:64),SCA,NTRUN,MULT
      REAL*8 PI,X10E,X100,ANGE,ANGO,SCAL(6),TOTR,TOTI
      INTEGER*2 NBIT(6)

N=2**N1
      PI=4.0D+00*DATAN(1.0D+00)

DO 10 J10=0,N/4-1
      X10E=DFLOAT(2*J10)
      X100=DFLOAT(2*J10+1)
      ANGE=PI*(X10E**2.0D+00+X10E)/DFLOAT(N)
      ANGO=PI*(X100**2.0D+00+X100)/DFLOAT(N)
      HR(J10)=DCOS(ANGO)
      HR(J10+N/4)=DSIN(ANGO)
      HI(J10)=DCOS(ANGE)
      HI(J10+N/4)=-DSIN(ANGE)
10    CONTINUE

TOTR=0.0D+00
      TOTI=0.0D+00
      DO 20 J20=0,N/2-1
      TOTR=TOTR+DABS(HR(J20))
      TOTI=TOTI+DABS(HI(J20))
20    CONTINUE
```

```
       IF(TOTR.GE.TOTI) MULT=TOTR
       IF(TOTR.LT.TOTI) MULT=TOTI
       NTRUN=2.0D+00**DFLOAT(NBIT(N1)-1)/MULT

DO 30 J30=0,N/2-1
       HR(J30)=SCAL(N1)*HR(J30)*NTRUN
       HI(J30)=SCAL(N1)*HI(J30)*NTRUN
30     CONTINUE

SCA=SCAL(N1)*NTRUN/2.0D+00

RETURN

END

C=====================================================================

SUBROUTINE ADD(XR,XI,N)

C      =============================================================
C      *                                                           *
C      *    THIS SUBROUTINE MAPS THE COMPLEX NUMBERS INTO REAL NUMBERS
C      *                                                           *
C      =============================================================

REAL*8 XR(0:4096),XI(0:4096),YR1,YI1,YR2,YI2

DO 10 J10=0,N/2-1
       YR1=XR(J10)-XI(J10+N/2)
       YR2=XR(J10+N/2)+XI(J10)
       YI1=XR(J10)+XI(J10+N/2)
       YI2=XR(J10+N/2)-XI(J10)

XR(J10)=YR1
       XR(J10+N/2)=YR2
       XI(J10)=YI1
       XI(J10+N/2)=YI2

10     CONTINUE

RETURN

END

=====================================================================

SUBROUTINE POLYPROD(X,H,N1,J1)

C      =============================================================
C      *                                                           *
C      *    THIS SUBROUTINE COMPUTES THE POLYNOMIAL PRODUCTS        *
C      *    MODULO (Z**N+1) WITH THE MODIFIED CHIRP TRANSFORM       *
C      *              USING NUMBER TRANSFORMS                       *
C      *                                                           *
C      =============================================================

REAL*8 X(0:4096),H(0:64),NFT,NFT2
       REAL*8 Y(0:64),XT(0:64),HT(0:64)

N=2**N1

NFT =2.0D+00**32.0D+00+1.0D+00
       NFT =DNINT(NFT)
       NFT2=2.0D+00**31.0D+00
       NFT2=DNINT(NFT2)

C      J1=1 COMPUTES YR
C      J1=0 COMPUTES YI

C      J10=0 FORMS THE EVEN SEQUENCE OF X
C      J10=1 FORMS THE ODD SEQUENCE OF X
```

```
      DO 10 J10=0,1
      DO 20 J20=0,N/2-1
      Y(J20)=X(2*J20+J10)
20    CONTINUE

DO 30 J30=0,N/2-1
      HT(J30)=H(J30)
      IF(HT(J30).LT.0.0D+00) HT(J30)=HT(J30)+NFT
      HT(J30)=DNINT(HT(J30))
      IF(Y(J30).LT.0.0D+00) Y(J30)=Y(J30)+NFT
      Y(J30)=DNINT(Y(J30))
30    CONTINUE

CALL MULT2(Y,N1-1,1)
      CALL MULT2(HT,N1-1,1)

CALL NTT(Y,N1-1,1)
      CALL NTT(HT,N1-1,1)

CALL MULT(Y,HT,N/2)

CALL NTT(Y,N1-1,-1)

CALL MULT2(Y,N1-1,-1)

DO 40 J40=0,N/2-1
      IF(Y(J40).GT.NFT2) XT(2*J40+J10)=Y(J40)-NFT
      IF(Y(J40).LE.NFT2) XT(2*J40+J10)=Y(J40)
40    CONTINUE

C     **********************************************************
C     *
C     *      CHECK TO MAKE SURE NUMBER TRANSFORM RESULT DID
C     *               NOT OVERFLOW FERMAT FIELD
C     *
C     **********************************************************

DO 50 J50=0,N/2-1
      Y(J50)=DNINT(X(2*J50+J10))
      HT(J50)=DNINT(H(J50))
50    CONTINUE

CALL POLYPROD1(Y,HT,N/2)

DO 60 J60=0,N/2-1
      IF(Y(J60).NE.XT(2*J60+J10)) WRITE(6,70)
70    FORMAT(1X,'ERROR')
60    CONTINUE

10    CONTINUE

DO 80 J80=0,N-1
      IF(J1.EQ.1.AND.J80.EQ.N-1) X(0) = -XT(N-1)
      IF(J1.EQ.1.AND.J80.NE.N-1) X(J80+1)=XT(J80)
      IF(J1.EQ.0) X(J80)=XT(J80)
80    CONTINUE

RETURN

END

C***********************************************************************
      SUBROUTINE MULT(NX,NH,N)

C     **********************************************************
C     *
C     *      THIS SUBROUTINE MULTIPLIES THE NUMBER TRANSFORMS FOR
C     *               EACH OF THE SEQUENCES TOGETHER
C     *
C     **********************************************************
```

```
      REAL*8 NX(0:64),NH(0:64),NFT,NFT2
      REAL*8 NX1,NX0,NH1,NH0,NXT,NTEMP

NFT =2.0D+00**32.0D+00+1.0D+00
      NFT =DNINT(NFT)
      NFT2=2.0D+00**16.0D+00
      NFT2=DNINT(NFT2)

DO 10 J10=0,N-1

NX1=NX(J10)/NFT2
      NX1=DINT(NX1)
      NX0=NX(J10)-NX1*NFT2

NH1=NH(J10)/NFT2
      NH1=DINT(NH1)
      NH0=NH(J10)-NH1*NFT2

NX(J10)=(NX1*NH0+NX0*NH1)*NFT2+(NX0*NH0-NX1*NH1)

IF(NX(J10).LT.NFT) GOTO 20
      NXT=NX(J10)/NFT
      NXT=DINT(NXT)
      NX(J10)=NX(J10)-NXT*NFT
      GOTO 10

20    IF(NX(J10).GE.0.0D+00) GOTO 10
      NXT=NX(J10)/NFT
      NXT=DINT(NXT)
      NTEMP=NXT*NFT
      IF(NX(J10).NE.NTEMP) NXT=NXT-1.0D+00
      NX(J10)=NX(J10)-NXT*NFT

10    CONTINUE

RETURN

END

C*********************************************************************
      SUBROUTINE NTT(NX,N1,J1)

C    *****************************************************************
C    *                                                               *
C    *       THIS SUBROUTINE COMPUTES THE NUMBER TRANSFORM FOR       *
C    *                     THE SEQUENCE NX                           *
C    *                                                               *
C    *****************************************************************

REAL*8 NX(0:64),NYB(0:64),NFT,NFT2
      REAL*8 NH,NX1,NX0,NH1,NH0,NTEMP,NXTT,NINV,NTRANS

N=2**N1

NFT =2.0D+00**32.0D+00+1.0D+00
      NFT =DNINT(NFT)
      NFT2=2.0D+00**16.0D+00
      NFT2=DNINT(NFT2)
      N2=2**(6-N1)

DO 10 J10=0,N1-1
      M2=2**J10
      M3=2**(N1-J10)/2

DO 20 J20=0,M2-1
      DO 30 J30=0,M3-1

NANG=J1*N2*J30*M2
      NSIGN=0
50    IF(NANG.GE.0) GOTO 40
```

```
              NANG=NANG+32
              NSIGN=NSIGN+1
              GOTO 50
     40       IF(NANG.LT.32) GOTO 60
              NANG=NANG-32
              NSIGN=NSIGN+1
              GOTO 40

60       M4=2*J20*M3+J30
              M5=(2*J20+1)*M3+J30

NYB(M5)=NX(M4)-NX(M5)
              NX(M4)= NX(M4)+NX(M5)
              IF(NX(M4).LT.NFT) GOTO 70
              NXTT=NX(M4)/NFT
              NXTT=DINT(NXTT)
              NX(M4)=NX(M4)-NXTT*NFT

70       IF(NYB(M5).GE.0.0D+00) GOTO 80
              NXTT=NYB(M5)/NFT
              NXTT=DINT(NXTT)
              NTEMP=NXTT*NFT
              IF(NYB(M5).NE.NTEMP) NXTT=NXTT-1.0D+00
              NYB(M5)=NYB(M5)-NXTT*NFT

80       NH=DFLOAT(NANG)
              NH=2.0D+00**NH
              NH=DNINT(NH)

NX1=NYB(M5)/NFT2
              NX1=DINT(NX1)
              NX0=NYB(M5)-NX1*NFT2

NH1=NH/NFT2
              NH1=DINT(NH1)
              NH0=NH-NH1*NFT2

NTEMP=(NX1*NH0+NX0*NH1)*NFT2+(NX0*NH0-NX1*NH1)
              NX(M5)=((-1)**NSIGN)*NTEMP

IF(NX(M5).LT.NFT) GOTO 90
              NXTT=NX(M5)/NFT
              NXTT=DINT(NXTT)
              NX(M5)=NX(M5)-NXTT*NFT
              GOTO 100

90       IF(NX(M5).GE.0.0D+00) GOTO 100
              NXTT=NX(M5)/NFT
              NXTT=DINT(NXTT)
              NTEMP=NXTT*NFT
              IF(NX(M5).NE.NTEMP) NXTT=NXTT-1.0D+00
              NX(M5)=NX(M5)-NXTT*NFT

100       CONTINUE
     30       CONTINUE
     20       CONTINUE
     10       CONTINUE

J110=0
              DO 120 J120=0,N-1
              NYB(J110)=NX(J120)
              DO 130 J130=1,N1
              IF(J110.GE.2**(N1-J130)) GOTO 140
              J110=J110+N/(2**J130)
              GOTO 120
    140       J110=J110-N/(2**J130)
    130       CONTINUE
    120       CONTINUE

DO 150 J150=0,N-1
              NX(J150)=NYB(J150)
    150       CONTINUE
```

```
      IF(J1.EQ.1) GOTO 160

NINV=DFLOAT(32-N1)
      NINV=2.0D+00**NINV
      NINV=DNINT(NINV)

NH1=NINV/NFT2
      NH1=DINT(NH1)
      NH0=NINV-NH1*NFT2

DO 170 J170=0,N-1

NX1=NX(J170)/NFT2
      NX1=DINT(NX1)
      NX0=NX(J170)-NX1*NFT2

NX(J170)=(-1.0D+00)*((NH1*NX0+NH0*NX1)*NFT2+(NH0*NX0-NH1*NX1))

IF(NX(J170).GE.0.0D+00) GOTO 180
      NXTT=NX(J170)/NFT
      NXTT=DINT(NXTT)
      NTEMP=NXTT*NFT
      IF(NX(J170).NE.NTEMP) NXTT=NXTT-1.0D+00
      NX(J170)=NX(J170)-NXTT*NFT

180   CONTINUE
170   CONTINUE

160   CONTINUE

RETURN

END

C===================================================================

SUBROUTINE MULT2(NX,N1,J1)

C ===================================================================
C *
C *      THIS SUBROUTINE MULTIPLIES THE SEQUENCE NX BY A
C *      2NTH ROOT OF UNITY IN THE FERMAT NUMBER FIELD
C *
C ===================================================================

REAL*8 NX(0:64),NFT,NFT2,NTEMP,NH,NH1,NH0
      REAL*8 NX1,NX0,NXTT

NFT =2.0D+00**32.0D+00+1.0D+00
      NFT =DNINT(NFT)
      NFT2=2.0D+00**16.0D+00
      NFT2=DNINT(NFT2)
      N=2**N1

DO 10 J10=0,N-1

N10=J1*(2**(6-N1)/2)*J10
      NSIGN=0
40    IF(N10.GE.0) GOTO 30
      N10=N10+32
      NSIGN=NSIGN+1
      GOTO 40
30    IF(N10.LT.32) GOTO 50
      N10=N10-32
      NSIGN=NSIGN+1
      GOTO 30

50    NH=DFLOAT(N10)
      NH=2**NH
      NH=DNINT(NH)
```

```
      NX1=NX(J10)/NFT2
      NX1=DINT(NX1)
      NX0=NX(J10)-NX1*NFT2

NH1=NH/NFT2
      NH1=DINT(NH1)
      NH0=NH-NH1*NFT2

NTEMP=(NX1*NH0+NX0*NH1)*NFT2+(NX0*NH0-NX1*NH1)
      NX(J10)=((-1)**NSIGN)*NTEMP

IF(NX(J10).LT.NFT) GOTO 60
      NXTT=NX(J10)/NFT
      NXTT=DINT(NXTT)
      NX(J10)=NX(J10)-NXTT*NFT
      GOTO 20

60    IF(NX(J10).GE.0.0D+00) GOTO 20
      NXTT=NX(J10)/NFT
      NXTT=DINT(NXTT)
      NTEMP=NXTT*NFT
      IF(NX(J10).NE.NTEMP) NXTT=NXTT-1.0D+00
      NX(J10)=NX(J10)-NXTT*NFT

20    CONTINUE
10    CONTINUE

RETURN

END

C************************************************************************

SUBROUTINE INVADD(XR,XI,N)

C     ****************************************************************
C     *                                                              *
C     *     THIS SUBROUTINE CONVERTS THE REAL NUMBERS BACK TO         *
C     *                COMPLEX NUMBERS                                *
C     *                                                              *
C     ****************************************************************

REAL*8 XR(0:4096),XI(0:4096),YR1,YR2,YI1,YI2

DO 10 J10=0,N/2-1
      YR1=0.5D+00*(XR(J10)+XI(J10))
      YR2=0.5D+00*(XR(J10+N/2)+XI(J10+N/2))
      YI1=0.5D+00*(XR(J10+N/2)-XI(J10+N/2))
      YI2=0.5D+00*(XI(J10)-XR(J10))

XR(J10)=YR1
      XR(J10+N/2)=YR2
      XI(J10)=YI1
      XI(J10+N/2)=YI2
10    CONTINUE

RETURN

END

C************************************************************************

SUBROUTINE FFT1D0(YR,YI,N1,N,J1)

C     ****************************************************************
C     *                                                              *
C     *       THIS SUBROUTINE COMPUTES THE FFT WITH THE               *
C     *     COOLEY-TUKEY DECIMATION IN FREQUENCY ALGORITHM            *
C     *                                                              *
C     ****************************************************************
```

```
      REAL*8 YR(0:4096),YI(0:4096),YBR(0:4096),YBI(0:4096)
      REAL*8 PI,ANG,WR,WI,XN,YRT1,YIT1,YRT,YIT,YRT2,YIT2

PI=4.0D+00*DATAN(1.0D+00)

DO 10 J10=0,N-1
      YBR(J10)=YR(J10)
      YBI(J10)=DFLOAT(J1)*YI(J10)
10    CONTINUE

DO 20 J20=0,N1-1
      M2=2**J20
      M3=2**(N1-J20)/2
      DO 30 J30=0,M2-1
      DO 40 J40=0,M3-1
      ANG=DFLOAT(J40*M2)
      WR=DCOS(2.0D+00*PI*ANG/DFLOAT(N))
      WI=DSIN(2.0D+00*PI*ANG/DFLOAT(N))
      M4=2*J30*M3+J40
      M5=(2*J30+1)*M3+J40
      YRT1=YBR(M4)+YBR(M5)
      YIT1=YBI(M4)+YBI(M5)
      YRT=YBR(M4)-YBR(M5)
      YIT=YBI(M4)-YBI(M5)
      YRT2=YRT*WR+YIT*WI
      YIT2=YIT*WR-YRT*WI
      YBR(M4)=YRT1
      YBI(M4)=YIT1
      YBR(M5)=YRT2
      YBI(M5)=YIT2
40    CONTINUE
30    CONTINUE
20    CONTINUE

XN=DFLOAT(N)
      IF(J1.EQ.1) XN=1.0D+00

J50=0
      DO 60 J60=0,N-1
      YR(J50)=YBR(J60)/XN
      YI(J50)=DFLOAT(J1)*YBI(J60)/XN
      DO 70 J70=1,N1
      IF(J50.GE.2**(N1-J70)) GOTO 80
      J50=J50+N/(2**J70)
      GOTO 60
80    J50=J50-N/(2**J70)
70    CONTINUE
60    CONTINUE

RETURN

END

C*****************************************************************

SUBROUTINE SCALE(YR,YI,N11,N12,NBITX,NSCALE,J1)

C
C     *****************************************************************
C     *                                                               *
C     *      THIS SUBROUTINE IS USED TO SCALE THE INPUT SEQUENCE      *
C     *      TO INSURE THAT THE NUMBER TRANSFORM RESULT DOES          *
C     *                NOT OVERFLOW THE FERMAT FIELD                  *
C     *                                                               *
C     *****************************************************************

REAL*8 YR(0:64,0:64),YI(0:64,0:64),YRT,YIT,FX,FMAX
      INTEGER*2 NBITX(6)

N21=2**N11
      N22=2**N12
      FX=DLOG10(2.0D+00)
```

```
      FMAX=0.0D+00
      IF(J1.EQ.1) NBIT=NBITX(N11)
      IF(J1.EQ.2) NBIT=NBITX(N12)

DO 10 J10=0,N21-1
      DO 20 J20=0,N22-1
      IF(YR(J10,J20).GT.FMAX) FMAX=YR(J10,J20)
      IF(YI(J10,J20).GT.FMAX) FMAX=YI(J10,J20)
20    CONTINUE
10    CONTINUE

IF(FMAX.EQ.0.0D+00) GOTO 30
      FMAX=DLOG10(FMAX)/FX
      IF(IIDINT(FMAX).LT.NBIT-2) J2=-1
      IF(IIDINT(FMAX).GE.NBIT-2) J2= 1
      NTRUN=IABS(IIDINT(FMAX)-NBIT+2)
      NSCALE=NSCALE+J2*NTRUN

DO 40 J40=0,N21-1
      DO 50 J50=0,N22-1
      IF(J2.EQ.1)  YR(J40,J50)=DNINT(YR(J40,J50)/DFLOAT(2**NTRUN))
      IF(J2.EQ.1)  YI(J40,J50)=DNINT(YI(J40,J50)/DFLOAT(2**NTRUN))
      IF(J2.EQ.-1) YR(J40,J50)=DNINT(YR(J40,J50)*DFLOAT(2**NTRUN))
      IF(J2.EQ.-1) YI(J40,J50)=DNINT(YI(J40,J50)*DFLOAT(2**NTRUN))
50    CONTINUE
40    CONTINUE
30    CONTINUE

RETURN

END

C*******************************************************************
      SUBROUTINE POLYPROD1(Y,H,N)
C   *************************************************************  *
C   *                                                              *
C   *         DIRECT CALCULATION OF POLYNOMIAL PRODUCT             *
C   *                    MODULO(Z**N + 1)                          *
C   *                                                              *
C   *************************************************************  *

REAL*8 Y(0:64),H(0:64),X(0:64)

DO 10 J10=0,N-1
      X(J10)=0.0D+00
10    CONTINUE

DO 20 J20=0,N-1
      DO 30 J30=0,N-1
      NSIGN=0
      NEXP=J20+J30
      IF(NEXP.GT.N-1) NSIGN=1
      IF(NEXP.GT.N-1) NEXP=NEXP-N
      X(NEXP)=X(NEXP)+(-1)**NSIGN*Y(J20)*H(J30)
30    CONTINUE
20    CONTINUE

DO 40 J40=0,N-1
      Y(J40)=X(J40)
40    CONTINUE

RETURN

END
```

What is claimed is:

1. A method for producing a radar signal description in a desired domain comprising:

receiving pulsed electromagnetic energy signals at an antenna;

receiving a set of radar signal pulses from the antenna and measuring at least two predetermined parameters of the received pulses;

converting the measurements for the set of received pulses to a sequence of pulse descriptor words having a first part and a second part in a predetermined domain;

employing a fast fourier transform engine with the following steps:

(i) mapping each pulse descriptor word into a two-dimensional matrix with word sorting means;

(ii) applying a chirp factor by employing a multiplication means and an up mixing factor to each word, along a defined dimension of the matrix;

(iii) encoding the matrix by employing encoding means according to the following equations by generating terms for the encoded matrix:

$$ar(n_1, n_2) = xr(n_1, n_2) - xi(n_1 + \tfrac{1}{2}N_1, n_2),$$
$$0 \leq n_1 \leq \tfrac{1}{2}N_1 - 1$$

$$ar(n_1, n_2) = xr(n_1, n_2) + xi(n_1 - \tfrac{1}{2}N_1, n_2),$$
$$\tfrac{1}{2}N_1 \leq n_1 \leq N_1 - 1$$

$$ai(n_1, n_2) = xr(n_1, n_2) + xi(n_1 - \tfrac{1}{2}N_1, n_2),$$
$$0 \leq n_1 \leq \tfrac{1}{2}N_1 - 1$$

$$ai(n_1, n_2) = xr(n_1, n_2) - xi(n_1 - \tfrac{1}{2}N_1, n_2),$$
$$\tfrac{1}{2}N_1 \leq n_1 \leq N_1 - 1$$

where $N_1$ is the total number of words in the matrix in the defined dimension of the matrix, $n_1$ is a whole number from 0 to $N_1-1$ indicating the position of each word along the defined dimension of the matrix, $n_2$ indicates the position of each word along any other dimensions of the matrix, $xr(n_1+n_2)$ and $xi(n_1,n_2)$ are the first and second parts respectively of a word in the matrix at position $(n_1,n_2)$ and $ar(n_1,n_2)$ and $ai(n_1,n_2)$ are the first and second parts respectively of a word in the encoded matrix at position $(n_1,n_2)$;

(iv) performing a forward and an inverse transform using a multiplication means along the defined dimension of the matrix;

(v) decoding the matrix employing decoding means;

(vi) applying a down mixing factor and a chirp factor to each word along the defined dimension; and applying each said word characterizing the electromagnetic energy to equipment for additional signal processing.

2. The method of claim 1 wherein the parameters comprise the amplitude and time of arrival of the received pulse and wherein the predetermined domain comprises the time domain.

3. The method of claim 1 further comprising converting the pulse descriptor words to the frequency domain before the step of mapping.

4. The method of claim 1 wherein the real part of each pulse descriptor word comprises an inphase part and the imaginary part of each pulse descriptor word comprises a quadrature part.

5. The method of claim 1 wherein the steps of performing a forward and an inverse transform comprise multiplying the matrix by a filter function after the forward transform and before the inverse transform.

6. The method of claim 5 wherein the filter function is determined by:

taking a one dimensional matrix having a length equal to one of the dimensions of the pulse descriptor word matrix;

applying a chirp factor and an up mixing factor to each word;

encoding the matrix; and performing a forward transform on the matrix.

7. The method of claim 6 wherein the step of taking a one dimensional matrix comprises taking a matrix for which each term has a value of one.

8. The method of claim 6 wherein the step of encoding the filter function matrix comprises applying the following equations to generate the terms of the encoded filter function matrix:

$$HR(n_1) = hr(n_1) - hi(n_1 + \tfrac{1}{2}N_1), \quad 0 \leq n_1 \leq \tfrac{1}{2}N_1 - 1$$

$$HR(n_1) = hr(n_1) + hi(n_1 - \tfrac{1}{2}N_1), \quad \tfrac{1}{2}N_1 \leq n_1 \leq N_1 - 1$$

$$HI(n_1) = hr(n_1) + hi(n_1 + \tfrac{1}{2}N_1), \quad 0 \leq n_1 \leq \tfrac{1}{2}N_1 - 1$$

$$HI(n_1) = hr(n_1) - hi(n_1 - \tfrac{1}{2}N_1), \quad \tfrac{1}{2}N_1 \leq n_1 \leq \tfrac{1}{2}N_1 - 1$$

where $N_1$ is the total number of words in the matrix, $n_1$ is a whole number from 0 to $N_1-1$ indicating the position of each word in the matrix, $hr(n_1)$ and $hi(n_1)$ are the real and imaginary parts respectively of a word in the matrix at position $n_1$ and $HR(n_1)$ and $HI(n_1)$ are the real and imaginary parts, respectively, of a word in the encoded matrix at position $n_1$.

9. A method for converting a signal description consisting of a set of signal pulse descriptor words each having a first part and a second part in a first domain to a signal description consisting of a set of signal pulse descriptor words having a first part and a second part in a second domain, the method comprising:

receiving signals by a sensor from a target;

receiving signal pulses from an antenna of the sensor;

converting said signal pulses to analog voltage signals;

sampling said analog voltage signal with an analog digital converter;

converting said sampled signals to digital pulse descriptor words;

using a fast fourier transform engine means employing the following steps:

(i) mapping each said signal pulse descriptor word serially into a matrix using word sorting means;

(ii) applying a chirp factor by employing a multiplication means and an up mixing factor to each word along a defined dimension of the matrix;

(iii) encoding the matrix with encoding means according to the following equations for generating terms for the encoded matrix:

$$ar(n_1, n_2) = xr(n_1, n_2) - xi(n_1 + \tfrac{1}{2}N_1, n_2),$$
$$0 \leq n_1 \leq \tfrac{1}{2}N_1 - 1$$

$$ar(n_1, n_2) = xr(n_1, n_2) + xi(n_1 - \tfrac{1}{2}N_1, n_2),$$
$$\tfrac{1}{2}N_1 \leq n_1 \leq N_1 - 1$$

$$ai(n_1, n_2) = xr(n_1, n_2) + xi(n_1 - \tfrac{1}{2}N_1, n_2),$$
$$0 \leq n_1 \leq \tfrac{1}{2}N_1 - 1$$

$$ai(n_1, n_2) = xr(n_1, n_2) - xi(n_1 - \tfrac{1}{2}N_1, n_2),$$
$$\tfrac{1}{2}N_1 \leq n_1 \leq N_1 - 1$$

where $N_1$ is the total number of words in the matrix in the defined dimension of the matrix, $n_1$ is a whole number from 0 to $N_1-1$ indicating the position of each word along the defined dimension of the matrix, $n_2$ indicates the position of each word along any other dimensions of the matrix, $xr((n_1,n_2)$ and xi $(n_1,n_2)$ are the first and second parts respectively of a word in the matrix at position $(n_1,n_2)$ and ar $(n_1,n_2)$ and ai $(n_1,n_2)$ are the first and second parts respectively of a word in the encoded matrix at position $(n_1,n_2)$;

(iv) performing a forward and an inverse transform using a multiplication means along the defined dimension of the matrix;

(v) decoding the matrix with decoding means;

(vi) applying a down mixing factor and a chirp factor to each word, in the transformed matrix along the defined dimension; and applying each said word characterizing said target to equipment for processing target characteristics.

10. The method of claim 9 wherein the signal is a received radar signal.

11. The method of claim 9 wherein the signal is a radar signal received by a pulsed doppler radar system.

12. The method of claim 11 wherein the pulsed doppler radar system is in an aircraft.

13. The method of claim 9 wherein the stops of performing a forward and an inverse transform comprise performing a forward number theoretic transform and an inverse number theoretic transform respectively.

14. The method of claim 9 where in the steps of performing a forward and an inverse transform comprise multiplying the matrix by a filter function after the forward transform and before the inverse transform.

15. The method of claim 14 wherein the filter function is determined by:

taking a one dimensional matrix having a length equal to one of the dimensions of the pulse descriptor word matrix;

applying a chirp factor and an up mixing factor to each word; encoding the matrix; and performing a forward transform on the matrix.

16. The method of claim 15 wherein the step of taking a one dimensional matrix comprises taking a matrix for which each term has a value of one.

17. The method of claim 15 wherein the step of encoding the filter function matrix comprises applying the following equations to generate the terms of the encoded filter function matrix:

$$HR(n_1) = hr(n_1) - hi(n_1 + \tfrac{1}{2}N_1), \quad 0 \leq n_1 \leq \tfrac{1}{2}N_1 - 1$$

$$HR(n_1) = hr(n_1) - hi(n_1 - \tfrac{1}{2}N_1), \quad \tfrac{1}{2}N_1 \leq n_1 \leq N_1 - 1$$

$$HI(n_1) = hr(n_1) + hi(n_1 + \tfrac{1}{2}N_1), \quad 0 \leq n_1 \leq \tfrac{1}{2}N_1 - 1$$

$$HI(n_1) = hr(n_1) - hi(n_1 - \tfrac{1}{2}N_1), \quad \tfrac{1}{2}N_1 \leq n_1 \leq N_1 - 1$$

where $N_1$ is the total number of words in the matrix, $n_1$ is a whole number from 0 to $N_1-1$ indicating the position of each word in the matrix, $hr(n_1)$ and $hi(n_1)$ are the real and imaginary parts, respectively, of a word in the matrix at position $n_1$, respectively, and $HR(n_1)$ and $HI(n_1)$ are the real and imaginary parts, respectively, of a word in the encoded matrix at position $n_1$.

18. The method of claim 9 wherein the mapping step comprises mapping each signal pulse descriptor word serially into a two dimensional matrix, wherein the forward and inverse transforms are performed along a first dimension or the matrix and wherein the method further comprises:

applying a chirp factor and an up mixing factor to each word in the transformed matrix along the second dimension of the matrix;

performing a forward and an inverse transform along the second dimension of the matrix; and applying a chirp factor and a down mixing factor to each word in the twice transformed matrix along the second dimension of the matrix.

19. A method, incorporated into a system which system has a sensor for receiving signal pulses, for converting a time domain pulse descriptor word set describing a stream of pulses and consisting of set of amplitude versus time pulse descriptor words each having a real and an imaginary part into a frequency domain pulse descriptor word set describing the same stream of pulses and consisting of a set of amplitude versus frequency pulse descriptor words each having a real and an imaginary part comprising:

receiving said signal pulses by the sensor;

obtaining said signal pulses from said sensor;

converting said signal pulses to analog voltage signals;

sampling said analog voltage signal with an analog digital converter;

converting said sampled signals to digital pulse descriptor words;

encoding the matrix using encoding means along the first dimension by applying the following equations to generate the terms of the encoded matrix:

$$ar(n_1, n_2) = xr(n_1, n_2) - xi(n_1 + \tfrac{1}{2}N_1, n_2),$$
$$0 \leq n_1 \leq \tfrac{1}{2}N_1 - 1$$

$$ar(n_1, n_2) = xr(n_1, n_2) + xi(n_1 - \tfrac{1}{2}N_1, n_2),$$
$$\tfrac{1}{2}N_1 \leq n_1 \leq N_1 - 1$$

$$ai(n_1, n_2) = xr(n_1, n_2) + xi(n_1 - \tfrac{1}{2}N_1, n_2),$$
$$0 \leq n_1 \leq \tfrac{1}{2}N_1 - 1$$

$$ai(n_1, n_2) = xr(n_1, n_2) - xi(n_1 - \tfrac{1}{2}N_1, n_2),$$
$$\tfrac{1}{2}N_1 \leq n_1 \leq N_1 - 1$$

where $N_1$ and $N_2$ are the number of words along the first and second dimensions of the matrix respectively, $n_1$ and $n_2$ are whole numbers from 0 to $N_1-1$ and from 0 to $N_2-1$ respectively indicative of the position of each word in the first and second dimensions of the matrix respectively, $xr(n_1,n_2)$ and $xi(n_1,n_2)$ are the real and imaginary parts respectively of a word in the matrix at position $(n_1,n_2)$ and ar $(n_1,n_2)$ and ai $(n_1,n_2)$ are the real and imaginary parts respectively of a word in the encoded matrix at position $(n_1,n_2)$;

performing a forward and an inverse transform using a multiplication means along the first dimension of the matrix;

decoding the matrix along the first dimension with decoding means;

applying a down mixing factor and a chirp factor to each word in the matrix after transformation, along the first dimension of the matrix;

applying a twiddle factor with a multiplication means to each word in the matrix;

applying a chirp factor and up mixing factor to each word in the matrix along the second dimension of the matrix;

performing a second forward and a second inverse transform on the second dimension of the matrix;

decoding the matrix along the second dimension using decoding means;

applying a down mixing factor and a chirp factor along the second dimension of the matrix; and applying each said word to equipment for processing.

20. The method of claim 19 wherein the stream of pulses consists of received radar signal pulses.

21. The method of claim 19 wherein the stream of pulses consists of radar signal pulses received from a pulsed doppler radar system.

22. The method of claim 19 wherein the steps of performing a forward and an inverse transform comprise performing a forward number theoretic transform and an inverse number theoretic transform respectively.

23. The method of claim 19 wherein the steps of performing a forward and an inverse transform comprise multiplying the matrix by a filter function after the forward transform and before the inverse transform.

24. The method of claim 23 wherein the filter function is determined by:
taking a one dimension matrix having a length equal to one of the dimensions of the pulse descriptor word matrix;
applying a chirp factor and an up mixing factor to each word; and
performing a forward transform on the matrix.

25. The method of claim 24 wherein the step of taking a one dimensional matrix comprises taking a matrix for which each term has a value of one.

26. The method of claim 24 further comprising encoding the one dimensional filter function matrix before performing a forward transform and after applying a chirp factor and an up mixing factor.

27. The method of claim 26 wherein the step of encoding the filter function matrix comprises applying the following equations to generate the terms of the encoded filter function matrix:

$$HR(n_1) = hr(n_1) - hi(n_1 + \tfrac{1}{2}N_1), \quad 0 \leq n_1 \leq \tfrac{1}{2}N_1 - 1$$

$$HR(n_1) = hr(n_1) + hi(n_1 + \tfrac{1}{2}N_1), \quad \tfrac{1}{2}N_1 \leq n_1 \leq N_1 - 1$$

$$HI(n_1) = hr(n_1) + hi(n_1 + \tfrac{1}{2}N_1), \quad 0 \leq n_1 \leq \tfrac{1}{2}N_1 - 1$$

$$HI(n_1) = hr(n_1) - hi(n_1 - \tfrac{1}{2}N_1), \quad \tfrac{1}{2}N_1 \leq n_1 \leq N_1 - 1$$

where $N_1$ is the total number of words in the matrix, $n_1$ is a whole number from 0 to $N_1 - 1$ indicating the position of each word in the matrix, $hr(n_1)$ and $hi(n_1)$ are the real and imaginary parts, respectively, of a word in the matrix at position $n_1$ and $HR(n_1)$ and $HI(n_1)$ are the real and imaginary parts, respectively, of a word in the encoded matrix at position $n_1$.

28. The method of claim 24 wherein the chirp factor is given by $e^{-j2\pi(\tfrac{1}{2}n1^2/N1)}$.

29. The method of claim 24 wherein the up mixing factor is given by $e^{-j2\pi(-n1/2N1)}$.

30. The method of claim 19 wherein the step of encoding the matrix along the second dimension comprises applying the following equations to generate the encoded matrix:

$$pr(m_1, n_2) = fr(m_1, n_2) - fi(m_1, n_2 + \tfrac{1}{2}N_2),$$
$$0 \leq n_2 \leq \tfrac{1}{2}N_2 - 1$$

$$pr(m_1, n_2) = fr(m_1, n_2) + fi(m_1, n_2 - \tfrac{1}{2}N_2),$$
$$\tfrac{1}{2}N_2 \leq n_2 \leq N_2 - 1$$

$$pi(m_1, n_2) = fr(m_1, n_2) + fi(m_1, n_2 + \tfrac{1}{2}N_2),$$
$$0 \leq n_2 \leq \tfrac{1}{2}N_2 - 1$$

$$pi(m_1, n_2) = fr(m_1, n_2) - fi(m_1, n_2 - \tfrac{1}{2}N_2),$$
$$\tfrac{1}{2}N_2 \leq n_2 \leq N_2 - 1$$

where $N_1$ and $N_2$ are the number of words along the first and second dimensions of the matrix respectively, $m_1$ and $n_2$ are whole numbers from 0 to $N_1 - 1$ and from 0 to $N_2 - 1$ respectively indicative of the position of each word in the first and second dimensions of the matrix respectively, fr $(m_1, n_2)$ and fi $(m_1, n_2)$ are the real and imaginary parts, respectively, of a word in the matrix at position $(m_1, n_2)$ and pr $(m_1, n_2)$, and pi $(m_1, n_2)$ are the real and imaginary parts of a word in the encoded matrix at position $(m_1, n_2)$.

31. The method of claim 19 wherein the steps of performing a second forward and inverse transform comprises multiplying the matrix by a filter function between the second forward and second inverse transforms.

32. The method of claim 31 wherein the filter function is determined by:
taking a one dimensional matrix having a length equal to the second dimension of the pulse descriptor word matrix;
applying a chirp factor and an up mixing factor to each word;
encoding the matrix; and
performing a forward transform on the matrix.

33. The method of claim 32 wherein the step of encoding the filter function matrix comprises applying the following equations to generate the terms of the encoded filter function matrix:

$$HR(n_2) = hr(n_2) - hi(n_2 + \tfrac{1}{2}N_2), \quad 0 \leq n_2 \leq \tfrac{1}{2}N_2 - 1$$

$$HR(n_2) = hr(n_2) + hi(n_2 - \tfrac{1}{2}N_2), \quad \tfrac{1}{2}N_2 \leq n_2 \leq N_2 - 1$$

$$HI(n_2) = hr(n_2) + hi(n_2 + \tfrac{1}{2}N_2), \quad 0 \leq n_2 \leq \tfrac{1}{2}N_2 - 1$$

$$HI(n_2) = hr(n_2) + hi(n_2 + \tfrac{1}{2}N_2), \quad \tfrac{1}{2}N_2 \leq n_2 \leq N_2 - 1$$

where $N_2$ is the total number of words in the matrix, $n_2$ is a whole number from 0 to $N_2 - 1$ indicating the position of each word in the matrix, hr $(n_2)$ and hi $(n_2)$ are the real and imaginary parts, respectively, of a word in the matrix at position $n_2$ and HR $(n_2)$ and HI $(n_2)$ are the real and imaginary parts, respectively, of a word in the encoded matrix at position $n_2$.

* * * * *